(12) United States Patent
Reynolds et al.

(10) Patent No.: US 11,384,198 B2
(45) Date of Patent: Jul. 12, 2022

(54) HIGH-GAP YELLOW AND ORANGE ELECTROCHROMIC POLYMERS

(71) Applicant: GEORGIA TECH RESEARCH CORPORATION, Atlanta, GA (US)

(72) Inventors: John Robert Reynolds, Dunwoody, GA (US); Kangli Cao, Shanghai (CN); Anna M. Osterholm, Atlanta, GA (US); Dwanleen E. Shen, Atlanta, GA (US); Dylan Thomas Christiansen, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 16/319,910

(22) PCT Filed: Aug. 22, 2017

(86) PCT No.: PCT/US2017/048013
§ 371 (c)(1),
(2) Date: Jan. 23, 2019

(87) PCT Pub. No.: WO2018/039230
PCT Pub. Date: Mar. 1, 2018

(65) Prior Publication Data
US 2019/0218338 A1    Jul. 18, 2019

Related U.S. Application Data

(60) Provisional application No. 62/377,922, filed on Aug. 22, 2016.

(51) Int. Cl.
*C08G 61/12* (2006.01)
*G02F 1/1516* (2019.01)
(Continued)

(52) U.S. Cl.
CPC .............. *C08G 61/126* (2013.01); *C09K 9/02* (2013.01); *C09K 11/06* (2013.01);
(Continued)

(58) Field of Classification Search
CPC ........ C09K 9/02; C09K 11/06; C08G 61/126; G02F 1/15165
(Continued)

(56) References Cited

U.S. PATENT DOCUMENTS 7,799,932 B2    9/2010    Reynolds et al.
8,399,603 B2    3/2013    Amb et al.
(Continued)

FOREIGN PATENT DOCUMENTS

WO    2015/179789 A1    11/2015
WO    WO 2015/184115    12/2015

OTHER PUBLICATIONS

Four Shade of Brown: Tuning of Electrochromic polymer blends toward high-contrast eyewear, ACS, Applied material and inerfaces, 2015, 7, 1413-1421.*
(Continued)

*Primary Examiner* — Ling Siu Choi
*Assistant Examiner* — Ronald Grinsted
(74) *Attorney, Agent, or Firm* — Saliwanchik, Lloyd & Eisenchenk

(57) ABSTRACT

Embodiments of the invention are directed to yellow/orange-to-transmissive conjugated polymers, a method to prepare the yellow/orange conjugated polymers, and an electrochromic and/or electroluminescent device comprising the neutral state yellow/orange conjugated polymers as one of a plurality of primary subtractive colored conjugated polymers. The yellow/orange conjugated polymers show enhanced redox stability and can have a $(D_2Ar_z)_n$ structure with a dioxyheterocycle repeating unit or a $(DAr_z)_n$ structure
(Continued)

with a dioxythiophene monomer that has at least one substituted carbon α to an oxygen of the monomer; and where the one to three Ar groups have at least one carbon α to the carbon attached to a D unit substituted that has at least 5 atoms in the substituent. The yellow/orange conjugated polymers show enhanced redox stability. The yellow/orange conjugated polymers are prepared by cross-condensation reactions.

15 Claims, 10 Drawing Sheets

(51) Int. Cl.
*C09K 9/02* (2006.01)
*C09K 11/06* (2006.01)
(52) U.S. Cl.
CPC ..... *G02F 1/15165* (2019.01); *C08G 2261/18* (2013.01); *C08G 2261/312* (2013.01); *C08G 2261/3223* (2013.01); *C08G 2261/3247* (2013.01); *C08G 2261/411* (2013.01); *C08G 2261/414* (2013.01); *C08G 2261/417* (2013.01); *C08G 2261/52* (2013.01); *C08G 2261/54* (2013.01); *C09K 2211/1458* (2013.01); *C09K 2211/1491* (2013.01)
(58) Field of Classification Search
USPC ........................................................ 252/583
See application file for complete search history.

(56) References Cited

U.S. PATENT DOCUMENTS

| 8,699,603 | B1 | 4/2014 | Baligh et al. |
| 10,294,416 | B2* | 5/2019 | Kerszulis ............. C08G 61/126 |
| 2012/0108778 | A1* | 5/2012 | Amb ........................ C09K 9/02 528/8 |
| 2013/0235323 | A1 | 9/2013 | Sotzing et al. |
| 2017/0267811 | A1* | 9/2017 | Reynolds ................ C09K 9/02 |

OTHER PUBLICATIONS

Amb, C.M. et al. "Propylenedioxythiophene (ProDOT)-phenylene copolymers allow a yellow-to-transmissive electrochrome," *Polymer Chemistry*, 2011, pp. 812-814, vol. 2.
Bhuvana, T. et al. "Reversible Full-Color Generation with Patterned Yellow Electrochromic Polymers," *Angew. Chem. Int. Ed.*, 2013, pp. 1180-1184, vol. 52.
Cao, K. et al. "Tuning Color, Contrast, and Redox Stability in High Gap Cathodically Coloring Electrochromic Polymers," *Macromolecules*, 2016, pp. 8498-8507, vol. 49.
Dyer, A.L. et al. "Orange and Red to Transmissive Electrochromic Polymers Based on Electron-Rich Dioxythiophenes," *Macromolecules*, 2010, pp. 4460-4467, vol. 43.
Kerszulis, J.A. et al. "Follow the Yellow Brick Road: Structural Optimization of Vibrant Yellow-to-Transmissive Electrochromic Conjugated Polymers," *Macromolecules*, 2014, pp. 5462-5469, vol. 47.
Osterholm, A.M. et al. "Four Shades of Brown: Tuning of Electrochromic Polymer Blends Toward High-Contrast Eyewear," *ACS Appl. Mater. Interfaces*, 2015, pp. 1413-1421, vol. 7.
European Supplementary Search Report, EP Application No. 17 84 4281, dated Feb. 19, 2020.

* cited by examiner i. Pd(OAc)$_2$ (2 mol%), PivOH (0.3 eq), K$_2$CO$_3$ (3eq), DMAc, 140 °C, 12h

HIGH-GAP YELLOW AND ORANGE ELECTROCHROMIC POLYMERS

CROSS-REFERENCE TO RELATED APPLICATIONS

This application is the U.S. national stage application of International patent application No. PCT/US2017/048013, filed Aug. 22, 2017, which claims the benefit of U.S. Provisional Application Ser. No. 62/377,922, the disclosures of which are hereby incorporated by reference in their entireties, including any figures, tables, or drawings.

The subject invention was made with government support under Grant No. FA9550-14-1-0271 awarded by the Air Force Office of Scientific Research. The government has certain rights in this invention.

BACKGROUND OF INVENTION

Conjugated polymers are used in electrochromic applications, allowing the coloration and redox properties to be tuned through structural design and synthesis. Cathodically coloring cyan, magenta, and yellow electrochromic polymers (ECPs), as well as numerous secondary colors, that switch from a vibrantly colored state to a colorless state upon electrochemical oxidation have been synthesized. These have yielded a broad palette of vibrant colors including browns and blacks that are accessible through blending of ECP solutions.

Dioxythiophene (DOT) based polymers have been used in the design of ECPs that undergo their colored-to-clear transition at low oxidation potentials. Mechanistically, oxidation of a neutral polymer leads to the formation of cation radicals (polarons) and dications (bipolarons), which give rise to conformational changes of the polymer backbone that affects the polymer's absorption profile. Spectroscopically, this occurs due to a decrease of the neutral π-π* absorption band in the visible range and the appearance of new charge carrier absorption bands at longer wavelengths. For the majority of DOT-based ECPs, charge carrier absorbance is shifted into the NIR, with minimal tailing into the visible region resulting in highly transmissive and nearly colorless films in the polymer's fully oxidized state. High gap ECPs are yellow or orange in their charge neutral states, absorbing in the 350-600 nm range (i.e. above 2.0 eV), that require the charge carrier transitions be transferred across the entire visible spectrum into the NIR for these materials to become colorless upon oxidation, as illustrated in FIG. 1. Attaining this spectral shift is challenging, and, in the oxidized state, most cathodically coloring yellow EC materials absorb in the long wavelength range of the visible giving rise to a blue color.

The first cathodically colored yellow-to-transmissive ECP, the alternating copolymer, poly(3,4-propylenedioxy-thiophene-alt-phenylene) (PProDOT-Ph) was disclosed in Amb et al. U.S. Pat. No. 8,699,603, Mar. 19, 2013. That ECP completed the subtractive color palette, enabling full color electrochromic displays and windows. PProDOT-Ph can be patterned in an electroactive grating to create an artificial chameleon effect, owing to its minimal absorption in the visible and its relatively large change in refractive index during redox switching, as disclosed in Bhuvana et al. *Angew. Chem. Int. Ed.* 2013, 52, 1180-4. Unlike most other DOT-based ECPs, PProDOT-Ph has a relatively high oxidation potential (ca. 1.1 V vs. Fci/Fc$^+$) for achievement of a fully bleached state, and this high potential can be attributed to the aromaticity of the phenylene unit. Although PProDOT-Ph has the potential for use in blends of ECPs to obtain various color hues or a broadly absorbing black or brown color, the large potential required to bleach the PProDOT-Ph component is beyond the stability limits of more easily oxidizable ECPs in a mixture, decreasing the redox switching stability of electrochromic films. Hence, the need for high-gap polymers with sufficiently low electrochemical oxidation potentials to permit highly stable ECPs, particularly those that may be solution processed, is an unfulfilled need in the art.

BRIEF SUMMARY

In an embodiment of the invention, a conjugated polymer has at least one $(D_2Ar_z)_n$ fully conjugated polymeric sequence of a donor (D) repeating unit selected from a dialkoxyheterocycle comprising alkoxy group or substituted alkoxy group having at least three carbon atoms, alkylenedioxyheterocycle having substituents on at least one of the alkylene carbons, and any combination thereof; and one to three aromatic (Ar) repeating units (z=1 to 3) comprising aromatic hydrocarbons, thiophene, furan, pyrrole, selenophene, and any combination thereof having at least one substituent of at least 5 atoms on a carbon α to the carbon attached to an adjacent D repeating unit of the conjugated polymer, Wherein n is 6 to 10,000, and wherein the conjugated polymer is yellow or orange in its neutral state and having an absorption maximum between 300 and 500 nm that upon oxidation is color neutral between 400-750 nm. The D repeating units for the $(D_2Ar_z)_n$ polymers can be of the structure:

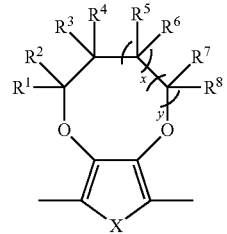

where: X is S, Se, O, or NR y is 0 or 1; and $R^1$, $R^2$, $R^3$, $R^4$, $R^5$, $R^6$, $R^7$ and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_3$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_3$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt. Alternatively or additionally, the D repeating units for the $(D_2Ar_z)_n$ polymers are of the structure:

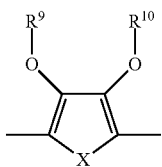

where: X is S, Se, O, or NR; R, $R^9$ and $R^{10}$ are independently $C_3$-$C_{30}$ alkyl, $C_3$-$C_{30}$ alkenyl, $C_3$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_3$-$C_{30}$ alkylester, $C_7$-$C_{15}$ arylester, $C_8$-$C_{30}$ alkylarylester, $C_4$-$C_{30}$ alkenylester, $C_4$-$C_{30}$ alkynylester, $NH_2$, $C_2$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl) amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl (aryl)amino, $C(O)NH_2$ (amido), $C_2$-$C_{30}$ alkylamido, $C_7$-$C_{14}$ arylamido, $C_8$-$C_{30}$ (arylalkyl)amido, $C_3$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, or $C_4$-$C_{14}$ tetraalkyammonium salt.

Alternately or additionally, the D units for the $(D_2Ar_z)_n$ polymers can be of the structures:

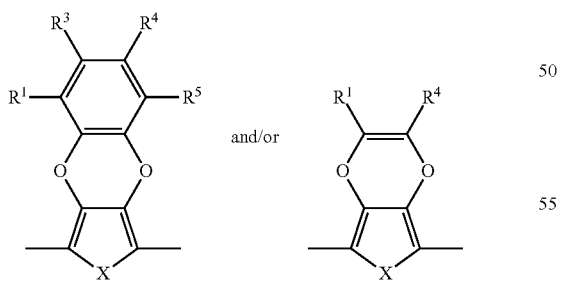

where: X is S, Se, O, or NR; x is 0 or 1; y is 0 or 1; and R, $R^1$, $R^3$, $R^4$, and $R^5$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt. All R groups can be H provided that at least one of the Ar group has at least one substituent of at least 5 atoms on a carbon $\alpha$ to the carbon attached to an adjacent D repeating unit of the conjugated polymer.

The Ar repeating units for the $(D_2Ar_z)_n$ polymers are of the structure:

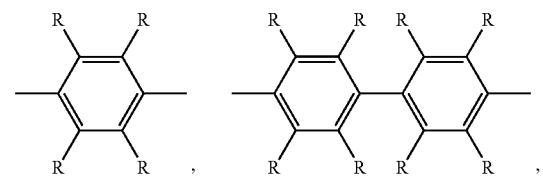

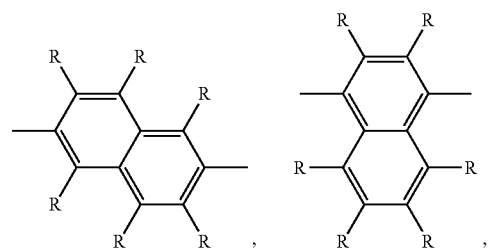

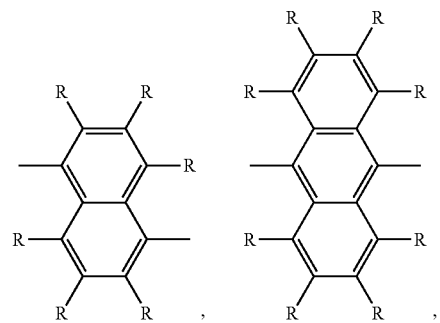

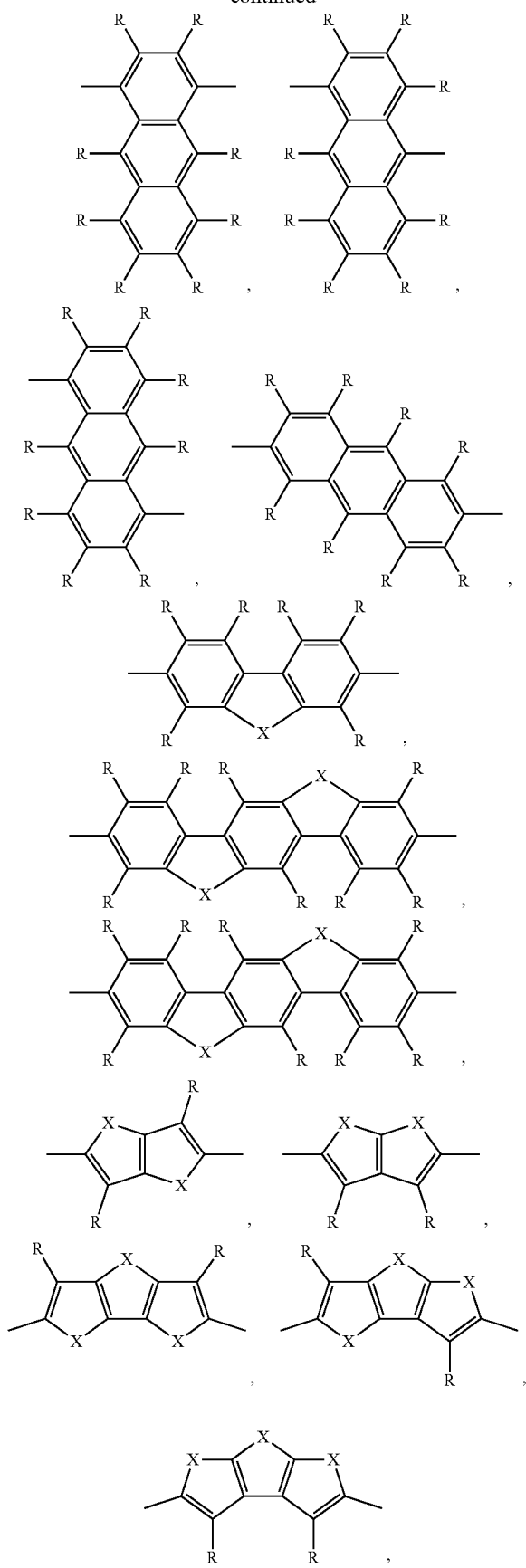

where: X is NR', PR', S, O, Se, $SO_x$, $CR_2$, $SiR'_2$, $GeR'_2$, or BR', where x=1 or 2; X' is NR', O, Se, or S; where R' is H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$alkylsulfonic acid, $C_3$-$C_{30}$ alkylsulfonate salt, $C_1$-$C_{30}$ alkylcarboxylate salt, $C_1$-$C_{30}$ alkylthiocarboxylate salt, $C_1$-$C_{30}$ alkyldithiocarboxylate salt or $C_3$-$C_{30}$ alkyl $C_4$-$C_{14}$ tetraalkylammonium salt; R" is independently H, $C_1$-$C_{30}$ alkyl, $C_3$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl; and R is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_1$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$alkylsulfonate salt, $C_1$-$C_{30}$ carboxylate salt, $C_1$-$C_{30}$ thiocarboxylate salt, $C_1$-$C_{30}$ dithiocarboxylate salt, or $C_4$-$C_{14}$ tetraalkyammonium salt, and where at least one R or R" groups on aromatic carbons α to the bonds directly in the polymer backbone are at least five atoms in size, for example, but not limited to, methoxy, ethyloxy, ethyl, propyl or methylamino.

In an embodiment of the invention, the $(D_2Ar_z)_n$ polymer has D unit that are dioxythiophenes, above, and Ar units that include, for example, dioxyselenophenes, dioxypyrroles, or dioxyfurans, but do not include dioxythiophenes, where the Ar units can be of the structures above and/or the structure:

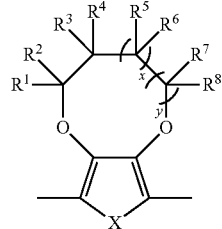

where: X is Se, O, or NR y is 0 or 1; and $R^1$, $R^2$, $R^3$, $R^4$, $R^5$, $R^6$, $R^7$ and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl) amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl) amino, $C_7$-$C_{30}$ di(arylalkyl)amino, $C_8$-$C_{30}$ alkyl(arylalkyl) amino, $C_{15}$-$C_{30}$ aryl(arylalkyl)amino, $C_8$-$C_{30}$ alkenyl(aryl) amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl) amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl (arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt. When combined with other Ar units the dioxyselenophene, dioxypyrrole, or dioxyfuan may be unsubstituted or substituted, or absent other Ar units the dioxyselenophene, dioxypyrrole, or dioxyfuan are substituted on at least one of the carbons α to the oxygen.

Alternatively or additionally, when the D units are dioxythiophenes, the Ar repeating units for the $(D_2Ar_z)_n$ polymers can be of the structures above and/or the structure:

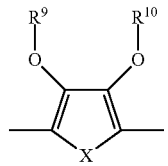

where: X is Se, O, or NR; R, $R^9$ and $R^{10}$ are independently $C_3$-$C_{30}$ alkyl, $C_3$-$C_{30}$ alkenyl, $C_3$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_3$-$C_{30}$ alkylester, $C_7$-$C_{15}$ arylester, $C_8$-$C_{30}$ alkylarylester, $C_4$-$C_{30}$ alkenylester, $C_4$-$C_{30}$ alkynylester, $NH_2$, $C_2$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl) amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl (aryl)amino, $C(O)NH_2$ (amido), $C_3$-$C_{30}$ alkylamido, $C_7$-$C_{14}$ arylamido, $C_8$-$C_{30}$ (arylalkyl)amido, $C_3$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, or $C_4$-$C_{14}$ tetraalkyammonium salt.

The fully conjugated polymeric sequence is a portion of a random copolymer. The fully conjugated polymeric sequence is a portion of a block, graft, branched, hyperbranched, or dendritic copolymer. The fully conjugated polymeric sequence is a portion of a network. The conjugated polymer or a polymeric precursor of the conjugated polymer can be soluble in at least one solvent. Exemplary solvents that can be employed are toluene, chloroform, dichloromethane, hexanes, tetrahydrofuran, chlorobenzene, water, ethanol, xylene, tetralin, or mesitylene. The conjugated polymer can be as a thin film where in the neutral state displays a lambda max between 400 nm and 500 nm and greater than about 90% transmittance from 600 nm-750 nm. The thin film comprising the conjugated polymer in the oxidized state is color neutral having an a* of no greater than +/−10 and b* of no greater than +/−10. The conjugated polymer can be electrochromic or electroluminescent. The conjugated polymer can have the structure: $PAcDOT_2$-Ph$(OMe)_2$, $PProDOT_2$-Ph$(OMe)_2$, or $PAcDOT_2$/$PProDOT_2$-Ph$(OMe)_2$, In an embodiment of the invention a conjugated polymer has a $(DAr_z)_n$ fully conjugated polymeric sequence of a donor (D) repeating unit selected from alkylenedioxyheterocycle having substituents on the alkylene carbons α to the oxygen alternating with one to three aromatic (Ar) repeating unit comprising aromatic hydrocarbons, thiophene, furan, pyrrole, selenophene, and any combination thereof, the Ar repeating unit having at least one substituent of at least 5 atoms on a carbon α to the carbon attached to an adjacent D repeating unit of the conjugated polymer, wherein n is 6 to 10,000, and wherein the conjugated polymer is yellow or orange in its neutral state and having an absorption maximum between 300 and 500 nm that upon oxidation is color neutral having an a* of no greater than +/−10 and b* of no greater than +/−10. The D repeating units for the $(DAr)_n$ polymers are of the structure:

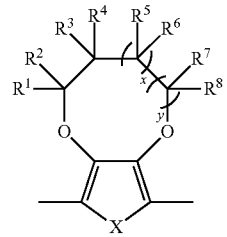

where: X is S; x is 0 or 1; y is 0 or 1; and $R^1$, $R^2$, $R^3$, $R^4$, $R^5$, $R^6$, $R^7$ and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt, and where at least one of $R^1$ and $R^2$ is not hydrogen. The conjugated polymer has at least one of $R^3$, $R^4$, $R^5$, $R^6$, $R^7$ and $R^8$ that is on the carbon α to the oxygen is not H.

Alternately or additionally, the D units for the $(D_2Ar_z)_n$ polymers can be of the structures:

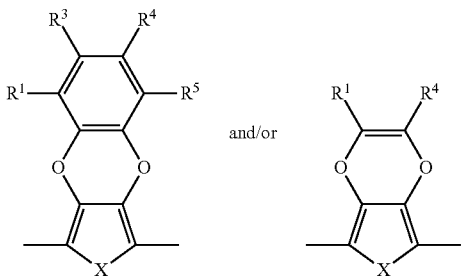

where: X is S, Se, O, or NR; x is 0 or 1; y is 0 or 1; and R, $R^1$, $R^3$, $R^4$, and $R^5$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt. All R groups can be H provided that at least one of the Ar group has at least one substituent of at least 5 atoms on a carbon α to the carbon attached to an adjacent D repeating unit of the conjugated polymer.

In an embodiment of the invention, the $(DAr_z)_n$ polymer has D unit that are dioxythiophenes and Ar units that include, for example, dioxyselenophenes, dioxypyrroles, or dioxyfurans, but do not include dioxythiophenes, where the Ar units can be of the structures above and/or the structures:

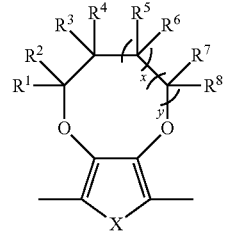

where: X is Se, O, or NR y is 0 or 1; and $R^1$, $R^2$, $R^3$, $R^4$, $R^5$, $R^6$, $R^7$ and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt. When combined with other Ar units the dioxyselenophene, dioxypyrrole, or dioxyfuan may be unsubstituted or substituted, or absent other Ar units the dioxyselenophene, dioxypyrrole, or dioxyfuan are substituted on at least one of the carbons α to the oxygen.

Alternatively or additionally, when the D units are dioxythiophenes, the additional Ar repeating units for the $(D_2Ar_z)_n$ polymers can include repeating units of the structure:

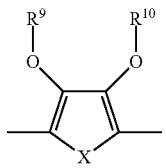

where: X is Se, O, or NR; R, $R^9$ and $R^{10}$ are independently $C_3$-$C_{30}$ alkyl, $C_3$-$C_{30}$ alkenyl, $C_3$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_3$-$C_{30}$ alkylester, $C_7$-$C_{15}$ arylester, $C_8$-$C_{30}$ alkylarylester, $C_4$-$C_{30}$ alkenylester, $C_4$-$C_{30}$ alkynylester, $NH_2$, $C_2$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_3$-$C_{30}$ alkylamido, $C_7$-$C_{14}$ arylamido, $C_8$-$C_{30}$ (arylalkyl)amido, $C_3$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, or $C_4$-$C_{14}$ tetraalkyammonium salt.

Embodiments of the invention are directed to the preparation of the above conjugated polymers where the method comprises a cross-coupling of monomers or trimers. The cross-coupling can be a direct arylation, Stille coupling, Kumada coupling, Hiyama coupling, Negishi coupling, inverse Suzuki coupling, Grignard methathesis (GRIM) or oxidative polymerization.

In embodiments of the invention, electrochromic devices (ECDs), can include the above conjugated polymer and include at least one non-yellow or non-orange conjugated polymer that displays a primary subtractive color in a neutral state and is color neutral in an oxidized state. The combined ECPs can include non-yellow conjugated polymers that display red and blue in the neutral state. The combined ECPs can include non-yellow conjugated polymers that display magenta and cyan in the neutral state.

DETAILED DISCLOSURE

Figure 1A:
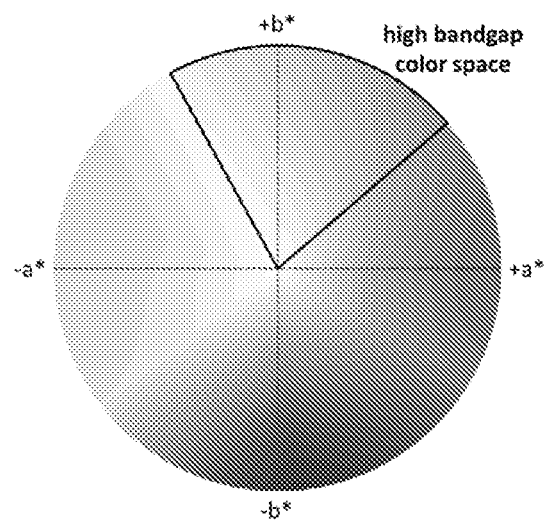
FIG. 1A shows an L*a*b* color wheel with the high bandgap color space demarcated.
Figure 1B:
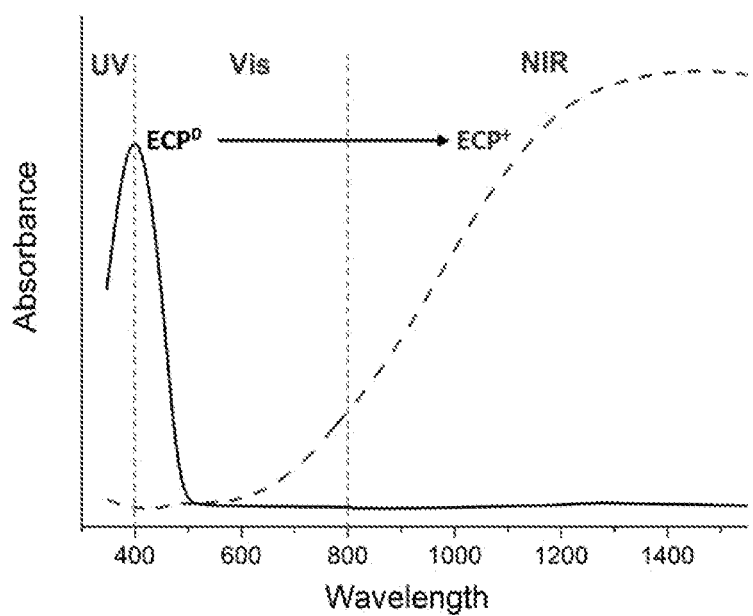
FIG. 1B shows a representative UV-Vis-NIR spectra of a high gap polymer in its charge neutral state, $ECP^0$ (solid line), and oxidized state, $ECP^+$ (dashed line).

Based on an extensive investigation of the structure-property relationships in dioxythiophene-arylene copolymers, embodiments of the invention are directed to yellow or orange-to-transmissive switching cathodically coloring ECPs, their preparation, and displays having a palette of subtractive colors including the neutral state yellow or orange conjugated polymer. The yellow conjugated polymers exhibit high optical contrasts at the wavelength of peak absorption in the neutral state, which upon oxidation become highly transmissive throughout the entire visible region. For purposes of the invention, high contrast of a conjugated polymer is considered to be achieved when a film can be switched from transmittance less than 40% at its wavelength of peak absorbance between 400 nm and 500 nm with transmittance greater than 90% from 600 nm-750 nm, to a film which displays greater than 30% transmittance at lambda max. In embodiments of the invention, the yellow and orange conjugated polymers are soluble in at least one solvent, for example toluene, chloroform, dichloromethane, hexanes, tetrahydrofuran, chlorobenzene, water, ethanol, other solvents or combination of solvents. From solution, the soluble yellow and orange conjugated polymers are readily incorporated into an electrochromic device using convenient deposition methods such as spin coating, spray casting, and printing techniques such as screen printing, inkjet printing, offset printing, rotogravure, slot-die coating, or flexography to form a thin film. In embodiments of the invention, yellow-to-transmissive or orange-to-transmissive conjugated polymers can be included in either reflective or transmissive ECDs which use conjugated polymers of three primary colors, either red, yellow and blue (RYB) or cyan, magenta and yellow (CMY), in a complete subtractive color space to allow any color to be produced by the appropriate color combination. In embodiments of the invention, the yellow-to-transmissive or orange-to-transmissive conjugated polymers can be included in a thin film with complementary colors to yield a black neutral state device and a transmissive oxidized state. These complete multicolor conjugated polymer devices can be used in various display technologies such as displays for electronics, full color e-books, and signage. In other embodiments of the invention, electroluminescent or combination electroluminescent/electrochromic devices are formed, having light emitting and/or electrochromic properties.

In an embodiment of the invention, the yellow and orange conjugated polymers are transmissive and color neutral in the oxidized state and yellow or orange in a neutral state with peak absorption, $\lambda_{max}$, at about 450 nm to about 500 nm, where as a thin film, the yellow or orange conjugated polymers display less than 20% transmission at peak absorption, and having an onset of absorption of 2.1-3.0 eV in the neutral state and can be converted by electrochemical reaction to a film with greater than 70% transmission throughout the visible spectrum from 400-750 nm. The yellow and orange conjugated polymers display high optical contrast in the visible region, possess rapid switching speeds, and good stability upon repetitive switching. The yellow conjugated polymers can be processed from solution, which is advantageous for use in reflective and transmissive electrochromic devices (ECDs), electroluminescent devices, or combination electroluminescent/electrochromic devices.

By increasing the strain imposed upon the backbone by steric features of the repeating units the color can be tuned and the oxidation potential required for switching can be diminished. For example, state of the art ECP-Yellow-1, shown below, can be modified from the alternating copolymer of an alkylene-dioxythiophene-arylene (DAr)$_n$ to a copolymer ECP-Yellow-2, according to an embodiment of the invention, shown below, where the decreased steric requirements of the ECP-Yellow-2 leads to a lower oxidation potential.

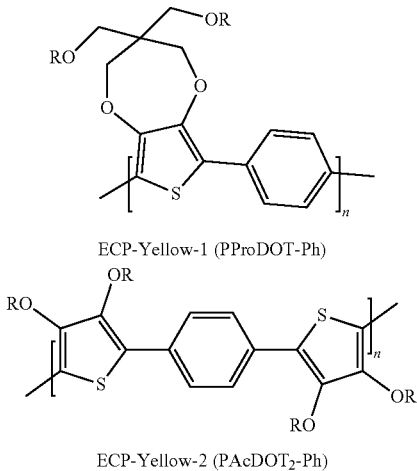

ECP-Yellow-1 (PProDOT-Ph)

ECP-Yellow-2 (PAcDOT$_2$-Ph)

where R is 2-ethylhexyl

As exemplified by the Yellow-2 structure above, it was discovered that increasing the electron-richness of the conjugated backbone, by incorporating e.g. carbazole (Cbz) or pyrene, or by using dimers of DOTs in the repeat unit, led to a decrease of the oxidation potential while maintaining a high band gap, due to steric interactions between the DOT and the arylene. The balance between steric and electron richness gives (D$_2$Ar)$_n$ polymers with oxidation potentials 0.2 V-0.3 V lower than ECP-Yellow-1, while retaining a vibrant yellow hue. The relatively low oxidation potential permits the use of these yellow-to-transmissive polymers in blends with other ECPs. However, although redox stability upon repeated switching is improved, the stability remains significantly lower than that of some other DOT-based ECPs. For example, PAcDOT$_2$-Ph exhibited a 5% decrease in contrast (A % T) over a hundred switches resulting in a decrease in the vibrancy of the colored state, compared with PProDOT homopolymer, which is stable over tens of thousands or more switches.

It was discovered that the redox stability of the polymer is enhanced by adding electron-rich substituents to the aromatic unit (Ar) and increasing the steric requirements of dioxythiopheneheterocycle (D) units in a (D$_2$Ar$_z$) copolymer, according to an embodiment of the invention, where a dyad of donor repeating units alternate with one to three non-acceptor aromatic repeating unit. (Acceptor (A) repeating units, such as, benzo[c][1,2,5]thiadiazole, benzo[c][1,2,5]oxadiazole, quinoxaline, benzo[d][1,2,3]triazole, pyrido[3,4-b]pyrazine, cyanovinylene, thiazolo[5,4-d]thiazole, 1,3,4-thiadiazole, pyrrolo[3,4-c]pyrrole-1,4-dione, 2,2'-bithiazole, [1,2,5]thiadiazolo[3,4-c]pyridine, thieno[3,4-b]pyrazine, [1,2,5]oxadiazolo[3,4-c]pyridine, dicyanovinylene, benzo[1,2-c;4,5-c']bis[1,2,5]thiadiazole, [1,2,5]thiadiazolo[3,4-g]quinoxaline, 4-dicyanomethylene-cyclopentadithiolene, benzo[c]thiophene or derivatives thereof, would otherwise form polymers that absorb in the vicinity of 700 nm.) In this manner a yellow and orange ECPs can switch from a about 10% transmittance (at $\lambda_{max}$) neutral state polymer to a nearly colorless oxidized state polymer with a transmittance above 65% through most of the visible region retaining or improving on the lower oxidation potential and redox stability of PAcDOT$_2$-Ph for these high band-gap ECPs.

In embodiments of the invention, donor D units for the (D$_2$Ar$_z$) polymers are of the structure:

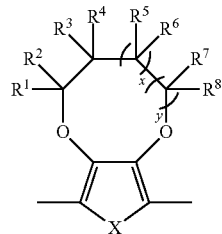

where: X is S, Se, O, or NR; x is 0 or 1; y is 0 or 1; and R, R$^1$, R$^2$, R$^3$, R$^4$, R$^5$, R$^6$, R$^7$ and R$^8$ are independently H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, hydroxy, C$_2$-C$_{30}$ alkoxy, C$_6$-C$_{14}$ aryloxy, C$_7$-C$_{30}$ arylalkyloxy, C$_2$-C$_{30}$ alkenyloxy, C$_2$-C$_{30}$ alkynyloxy, C$_8$-C$_{30}$ arylalkenyloxy, C$_8$-C$_{30}$ arylalkynyloxy, CO$_2$H, C$_2$-C$_{30}$ alkylester, C$_7$-C$_{15}$ arylester, C$_8$-C$_{30}$ alkylarylester, C$_3$-C$_{30}$ alkenylester, C$_3$-C$_{30}$ alkynylester, NH$_2$, C$_3$-C$_{30}$ alkylamino, C$_6$-C$_{14}$ arylamino, C$_7$-C$_{30}$ (arylalkyl)amino, C$_3$-C$_{30}$ alkenylamino, C$_3$-C$_{30}$ alkynylamino, C$_8$-C$_{30}$ (arylalkenyl)amino, C$_8$-C$_{30}$ (arylalkynyl)amino, C$_3$-C$_{30}$ dialkylamino, C$_{12}$-C$_{28}$ diarylamino, C$_4$-C$_{30}$ dialkenylamino, C$_4$-C$_{30}$ dialkynylamino, C$_7$-C$_{30}$ aryl(alkyl)amino, C$_7$-C$_{30}$ di(arylalkyl)amino, C$_8$-C$_{30}$ alkyl(arylalkyl)amino, C$_{15}$-C$_{30}$ aryl(arylalkyl)amino, C$_8$-C$_{30}$ alkenyl(aryl)amino, C$_8$-C$_{30}$ alkynyl(aryl)amino, C(O)NH$_2$ (amido), C$_2$-C$_{30}$ alkylamido, C$_7$-C$_{14}$ arylamido, C$_8$-C$_{30}$ (arylalkyl)amido, C$_2$-C$_{30}$ dialkylamido, C$_{12}$-C$_{28}$ diarylamido, C$_8$-C$_{30}$ aryl(alkyl)amido, C$_{15}$-C$_{30}$ di(arylalkyl)amido, C$_9$-C$_{30}$ alkyl(arylalkyl)amido, C$_{16}$-C$_{30}$ aryl(arylalkyl)amido, thiol, C$_2$-C$_{30}$ hydroxyalkyl, C$_6$-C$_{14}$ hydroxyaryl, C$_7$-C$_{30}$ hydroxyarylalkyl, C$_3$-C$_{30}$ hydroxyalkenyl, C$_3$-C$_{30}$ hydroxyalkynyl, C$_8$-C$_{30}$ hydroxyarylalkenyl, C$_8$-C$_{30}$ hydroxyarylalkynyl, C$_3$-C$_{30}$ polyether, C$_3$-C$_{30}$ polyetherester, C$_3$-C$_{30}$ polyester, C$_3$-C$_{30}$ polyamino, C$_3$-C$_{30}$ polyaminoamido, C$_3$-C$_{30}$ polyaminoether, C$_3$-C$_{30}$ polyaminoester, C$_3$-C$_{30}$ polyamidoester, C$_3$-C$_{30}$ alkylsulfonic acid, C$_3$-C$_{30}$ alkylsulfonate salt, C$_2$-C$_{30}$ carboxylate salt, thiocarboxylate salt, dithiocarboxylate salt or C$_4$-C$_{14}$ tetraalkylammonium salt. Alkyl groups can be straight, branched, multiply branched, cyclic, or polycyclic where cyclic and polycyclics can be unsubstituted, substituted, or polysubstituted, alkenyl can be a monoene, conjugated or non-conjugated polyene, straight, branched, multiply branched, cyclic, or polycyclic, terminal or internal, substituted at any carbon, E or Z isomers or mixture thereof, alkynes can be mono-yne, conjugated or non-conjugated poly-yne, terminal or internal, substituted at any carbon, aryl groups can be cyclic, fused or unfused polycyclic of any geometry, asymmetric functional groups, such as ester and amido, can have either orientation with respect to the alkylenedioxythiophene rings, poly can be 2 or more. Heteroatoms in substituents R$^1$-R$^8$ can be at any position of those substituents. For example an oxygen of an ether or ester or a nitrogen of an amine or amide can be in the alpha, beta, gamma or any other position relative to the point of attachment to the 3,4-alkylenedioxythiophene. Heteroatom containing substituents can have a plurality of heteroatoms, for example, ether can be a monoether, a diether or a polyether, amine can be a monoamine, a diamine or a polyamine, ester can be a monoester, a diester, or a polyester, and amide can be a monoamide, a diamide or a polyamide. Ether and ester groups can be thioethers, thioesters and hydroxy groups can be thiol (mercapto) groups, where sulfur is substituted for oxygen. Salts can be those of alkali or alkali earth metals, ammonium salts, or phosphonium salts.

In embodiments of the invention, the D units for the (D$_2$Ar$_z$)$_n$ polymers can be of the structures:

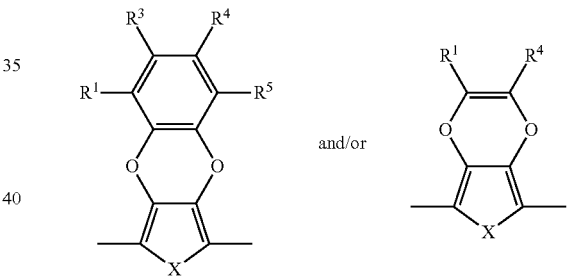

and/or where: X is S, Se, O, or NR; x is 0 or 1; y is 0 or 1; and R, R$^1$, R$^3$, R$^4$, and R$^5$ are independently H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, hydroxy, C$_2$-C$_{30}$ alkoxy, C$_6$-C$_{14}$ aryloxy, C$_7$-C$_{30}$ arylalkyloxy, C$_2$-C$_{30}$ alkenyloxy, C$_2$-C$_{30}$ alkynyloxy, C$_8$-C$_{30}$ arylalkenyloxy, C$_8$-C$_{30}$ arylalkynyloxy, CO$_2$H, C$_2$-C$_{30}$ alkylester, C$_7$-C$_{15}$ arylester, C$_8$-C$_{30}$ alkylarylester, C$_3$-C$_{30}$ alkenylester, C$_3$-C$_{30}$ alkynylester, NH$_2$, C$_3$-C$_{30}$ alkylamino, C$_6$-C$_{14}$ arylamino, C$_7$-C$_{30}$ (arylalkyl)amino, C$_3$-C$_{30}$ alkenylamino, C$_3$-C$_{30}$ alkynylamino, C$_8$-C$_{30}$ (arylalkenyl)amino, C$_8$-C$_{30}$ (arylalkynyl)amino, C$_3$-C$_{30}$ dialkylamino, C$_{12}$-C$_{28}$ diarylamino, C$_4$-C$_{30}$ dialkenylamino, C$_4$-C$_{30}$ dialkynylamino, C$_7$-C$_{30}$ aryl(alkyl)amino, C$_7$-C$_{30}$ di(arylalkyl)amino, C$_8$-C$_{30}$ alkyl(arylalkyl)amino, C$_{15}$-C$_{30}$ aryl(arylalkyl)amino, C$_8$-C$_{30}$ alkenyl(aryl)amino, C$_8$-C$_{30}$ alkynyl(aryl)amino, C(O)NH$_2$ (amido), C$_2$-C$_{30}$ alkylamido, C$_7$-C$_{14}$ arylamido, C$_8$-C$_{30}$ (arylalkyl)amido, C$_2$-C$_{30}$ dialkylamido, C$_{12}$-C$_{28}$ diarylamido, C$_8$-C$_{30}$ aryl(alkyl)amido, C$_{15}$-C$_{30}$ di(arylalkyl)amido, C$_9$-C$_{30}$ alkyl(arylalkyl)amido, C$_{16}$-C$_{30}$ aryl(arylalkyl)amido, thiol, C$_2$-C$_{30}$ hydroxyalkyl, C$_6$-C$_{14}$ hydroxyaryl, C$_7$-C$_{30}$ hydroxyarylalkyl, C$_3$-C$_{30}$ hydroxyalkenyl, C$_3$-C$_{30}$ hydroxyalkynyl, C$_8$-C$_{30}$ hydroxyarylalkenyl, C$_8$-C$_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt. All R groups can be H provided that at least one of the Ar group has at least one substituent of at least 5 atoms on a carbon α to the carbon attached to an adjacent D repeating unit of the conjugated polymer.

In embodiments of the invention, donor D units for the $(D_2Ar_z)_n$ polymers can be of the structure:

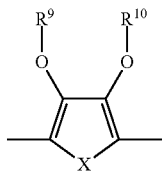

where: X is S, Se, O, or NR; R, $R^9$ and $R^{10}$ are independently $C_3$-$C_{30}$ alkyl, $C_3$-$C_{30}$ alkenyl, $C_3$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_3$-$C_{30}$ alkylester, $C_7$-$C_{15}$ arylester, $C_8$-$C_{30}$ alkylarylester, $C_4$-$C_{30}$ alkenylester, $C_4$-$C_{30}$ alkynylester, $NH_2$, $C_2$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_3$-$C_{30}$ alkylamido, $C_7$-$C_{14}$ arylamido, $C_8$-$C_{30}$ (arylalkyl)amido, $C_3$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, or $C_4$-$C_{14}$ tetraalkylammonium salt. Alkyl groups can be straight, branched, multiply branched, cyclic, or polycyclic where cyclic and polycyclics can be unsubstituted, substituted, or polysubstituted, alkenyl can be a monoene, conjugated or non-conjugated polyene, straight, branched, multiply branched, cyclic, or polycyclic, terminal or internal, substituted at any carbon, E or Z isomers or mixture thereof, alkynes can be mono-yne, conjugated or non-conjugated poly-yne, terminal or internal, substituted at any carbon, aryl groups can be cyclic, fused or unfused polycyclic of any geometry, asymmetric functional groups, such as ester and amido, can have either orientation with respect to the 3,4-dioxythiophene rings, poly can be 2 or more. Heteroatoms in substituents $R^9$ and $R^{10}$ can be at any reasonable position of those substituents. For example an oxygen of an ether or ester or a nitrogen of an amine or amide can be in the beta, gamma or any other position relative to the point of attachment to the 3,4-dioxythiophene, but not the alpha position. Heteroatom containing substituents can have a plurality of heteroatoms, for example ether can be a monoether, a diether or a polyether, amine can be a monoamine, a diamine or a polyamine, ester can be a monoester, a diester, or a polyester, and amide can be a monoamide, a diamide or a polyamide. Ethers and esters groups can be thioethers, thioesters and hydroxy groups can be thiol (mercapto) groups, where sulfur is substituted for oxygen. Salts can be those of alkali or alkali earth metals, ammonium salts, or phosphonium salts.

In embodiments of the invention the aromatic units Ar are:

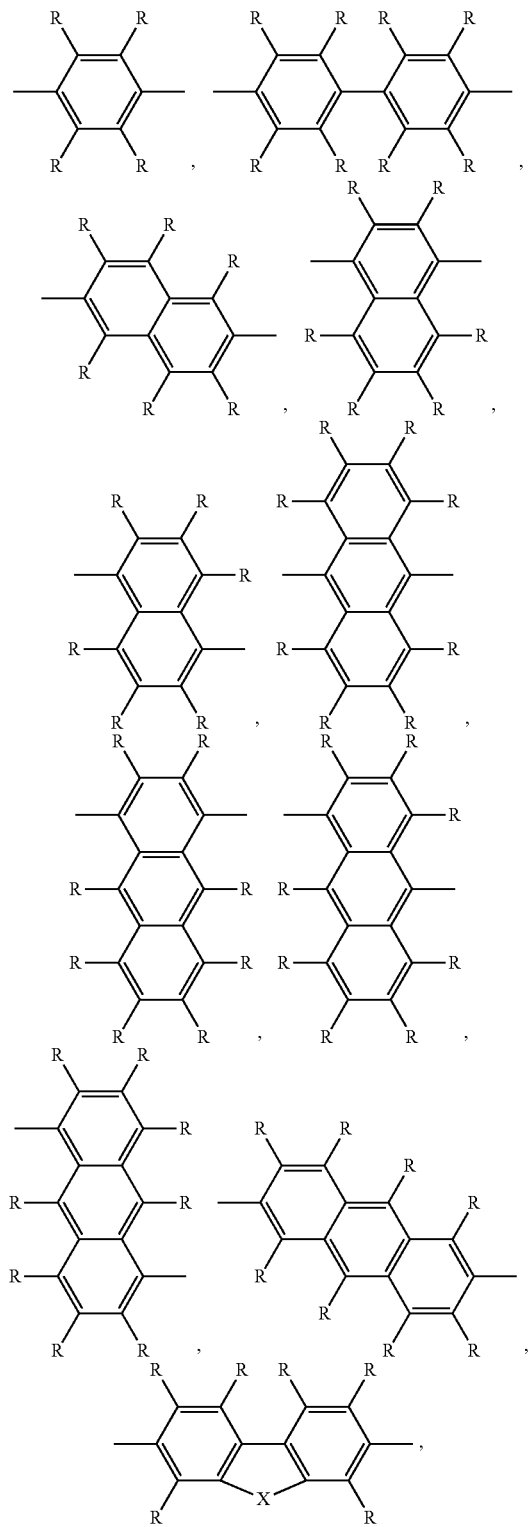

-continued

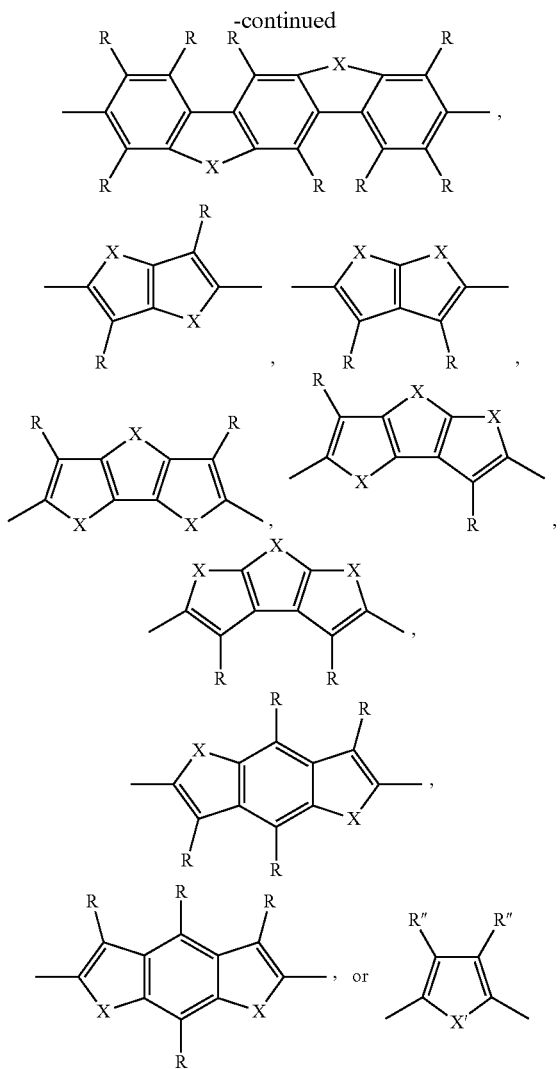

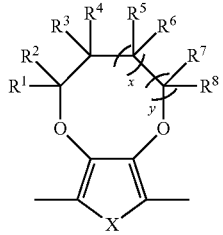

where: X is NR', PR', S, O, Se, $SO_x$, $CR_2$, $SiR'_2$, $GeR'_2$, or BR', where x=1 or 2; X' is NR', O, Se, or S; where R' is H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_1$-$C_{30}$ alkylcarboxylate salt, $C_1$-$C_{30}$ alkylthiocarboxylate salt, $C_1$-$C_{30}$ alkyldithiocarboxylate salt or $C_3$-$C_{30}$ alkyl $C_1$-$C_4$ trialkyammonium salt; R" is independently H, $C_1$-$C_{30}$ alkyl, $C_3$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl; and R is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_1$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_1$-$C_{30}$ carboxylate salt, $C_1$-$C_{30}$ thiocarboxylate salt, $C_1$-$C_{30}$ dithiocarboxylate salt, or $C_3$-$C_{30}$ alkyl $C_4$-$C_{14}$ tetraalkylammonium salt, and where at least two R groups on aromatic carbons α to the bonds directly in the conjugated polymer backbone are at least five atoms in size, for example, but not limited to, methoxy, ethyloxy, ethyl, propyl or methylamino.

In an embodiment of the invention, the $(D_2Ar_z)_n$ polymer has D unit that are dioxythiophenes and Ar units that include, for example, dioxyselenophenes, dioxypyrroles, or dioxyfurans, but do not include dioxythiophenes, where the Ar units can be of the structures above and/or the structure:

where: X is Se, O, or NR y is 0 or 1; and $R^1$, $R^2$, $R^3$, $R^4$, $R^5$, $R^6$, $R^7$ and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt. When combined with other Ar units the dioxyselenophene, dioxypyrrole, or dioxyfuan may be unsubstituted or substituted, or absent other Ar units the dioxyselenophene, dioxypyrrole, or dioxyfuan are substituted on at least one of the carbons α to the oxygen.

Alternatively or additionally, when the D units are dioxythiophenes, the Ar repeating units for the $(D_2Ar_z)_n$ polymers can be of the structures above and/or the structure:

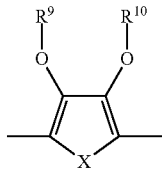

where: X is Se, O, or NR; R, $R^9$ and $R^{10}$ are independently $C_3$-$C_{30}$ alkyl, $C_3$-$C_{30}$ alkenyl, $C_3$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_3$-$C_{30}$ alkylester, $C_7$-$C_{15}$ arylester, $C_8$-$C_{30}$ alkylarylester, $C_4$-$C_{30}$ alkenylester, $C_4$-$C_{30}$ alkynylester, $NH_2$, $C_2$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_3$-$C_{30}$ alkylamido, $C_7$-$C_{14}$ arylamido, $C_8$-$C_{30}$ (arylalkyl)amido, $C_3$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, or $C_4$-$C_{14}$ tetraalkyammonium salt.

Figure 2:
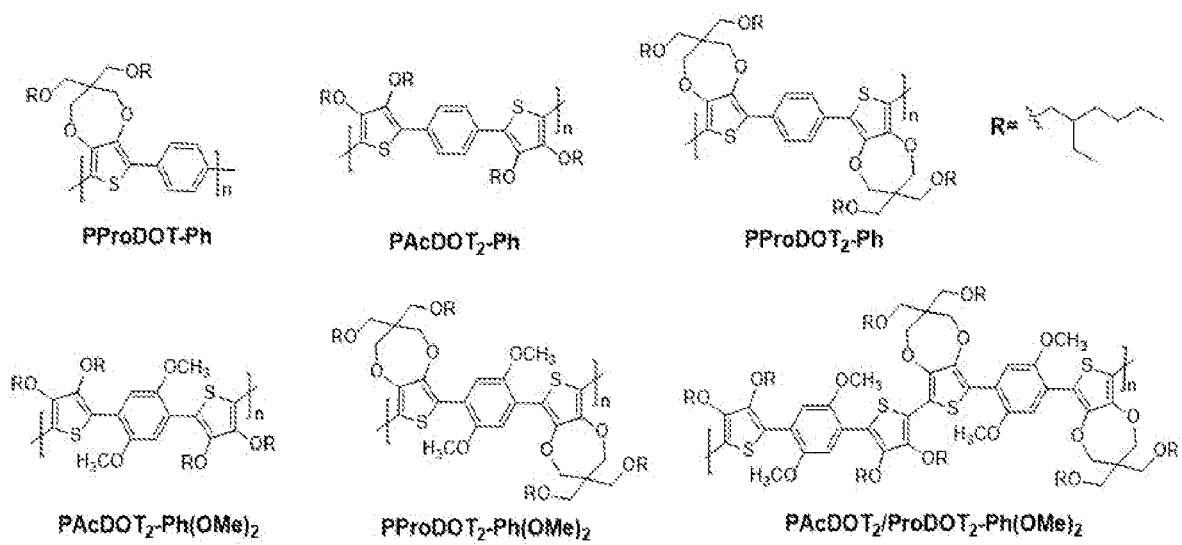
FIG. 2 shows contrasting structures for low redox stability state of the art high gap polymers, top line, and more redox stable high gap polymers, bottom line, according to an embodiment of the invention.

FIG. 2 shows examples of low redox stability yellow/orange polymers in the top row and the high gap copolymers of 2,5-dimethoxy-1,4-phenylene polymerized with a variety of DOTs, according to an embodiment of the invention. In the case of the yellow ECP PAcDOT$_2$-Ph(OMe)$_2$, the presence of the bulky electron-rich methoxy units a to the bonds directly in the polymer backbone on the phenylene ring increases the steric hindrance in the backbone and pushes the band gap to higher energy, which promotes a brighter yellow color, while its electron donating character lowers the oxidation potential. With the orange ECP PProDOT$_2$-Ph(OMe)$_2$, electron-rich methoxy units similarly lower the oxidation potential of the polymer, however differences in the bulkiness of ProDOT compared to AcDOT simultaneously lead to a decrease in the band gap, in contrast to the trend observed in the AcDOT analogs. The methoxy-substituted analogs provide improved redox stability over prolonged redox switching. By forming the alternating triad polymer PAcDOT$_2$/PProDOT$_2$-Ph(OMe)$_2$, the beneficial properties of PProDOT$_2$-Ph(OMe)$_2$ (low oxidation potential with high EC contrast) with the higher band gap AcDOT$_2$-based polymers yields a yellow copolymer with fast switching kinetics, high contrast (>65%), and improved electrochemical stability.

In an embodiment of the invention, a yellow or orange electrochromic polymer is an alternating copolymer of the structure $(DAr_z)_n$ where the Ar group has the structure:

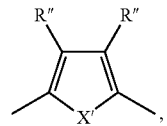

which leads to a high stability when the R'' group is $C_3$-$C_{30}$ alkyl, $C_3$-$C_{30}$ alkenyl, $C_3$-$C_{30}$ alkynyl, $C_6$-$C_{14}$ aryl, $C_7$-$C_{30}$ arylalkyl, $C_8$-$C_{30}$ arylalkenyl, or $C_8$-$C_{30}$ arylalkynyl, when combined with the dioxythiophene D portion into a $(DAr)_n$ alternating copolymer. The donor D units for the $(DAr)_n$ polymers are of the structure:

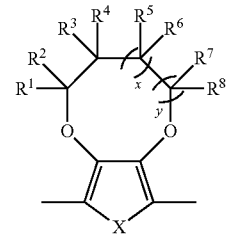

where: X is S, Se, O, or NR, x is 0 or 1; y is 0 or 1; and $R^1$, $R^2$, $R^3$, $R^4$, $R^5$, $R^6$, $R^7$ and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxyl, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamine, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$alkylsulfonate salt, $C_2$-$C_{30}$ carboxylate salt, thiocarboxylate salt, dithiocarboxylate salt or $C_4$-$C_{14}$ tetraalkylammonium salt; and where at least one or $R_1$ and $R_2$, is not H. Alkyl groups can be straight, branched, multiply branched, cyclic, or polycyclic where cyclic and polycyclics can be unsubstituted, substituted, or polysubstituted, alkenyl can be a mono-ene, conjugated or non-conjugated polyene, straight, branched, multiply branched, cyclic, or polycyclic, terminal or internal, substituted at any carbon, E or Z isomers or mixture thereof, alkynes can be mono-yne, conjugated or non-conjugated poly-yne, terminal or internal, substituted at any carbon, aryl groups can be cyclic, fused or unfused polycyclic of any geometry, asymmetric functional groups, such as ester and amido, can have either orientation with respect to the alkylenedioxythiophene rings, poly can be 2 or more. Heteroatoms in substituents $R^1$-$R^8$ can be at any position of those substituents. For example an oxygen of an ether or ester or a nitrogen of an amine or amide can be in the alpha, beta, gamma or any other position relative to the point of attachment to the 3,4-alkylenedioxythiophene. Heteroatom containing substituents can have a plurality of heteroatoms, for example, ether can be a monoether, a diether or a polyether, amine can be a monoamine, a diamine or a polyamine, ester can be a monoester, a diester, or a polyester, and amide can be a monoamide, a diamide or a polyamide. Ethers and esters groups can be thioethers, thioesters and hydroxy groups can be thiol (mercapto) groups, where sulfur is substituted for oxygen. Salts can be those of alkali or alkali earth metals, ammonium salts, or phosphonium salts.

In embodiments of the invention, the D units for the $(D_2Ar_z)$ polymers can be of the structures:

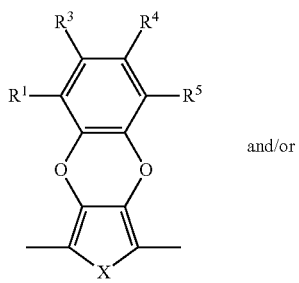 and/or 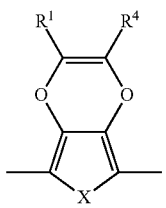

where: X is S, Se, O, or NR; x is 0 or 1; y is 0 or 1; and R, $R^1$, $R^3$, $R^4$, and $R^5$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt. All $R^1$, $R^3$, $R^4$, and $R^5$ groups can be H provided that at least one of the Ar group has at least one substituent of at least 5 atoms on a carbon α to the carbon attached to an adjacent D repeating unit of the conjugated polymer. Examples of the $(DAr_z)_n$ ECPs, according to embodiments of the invention, include, but are not limited to

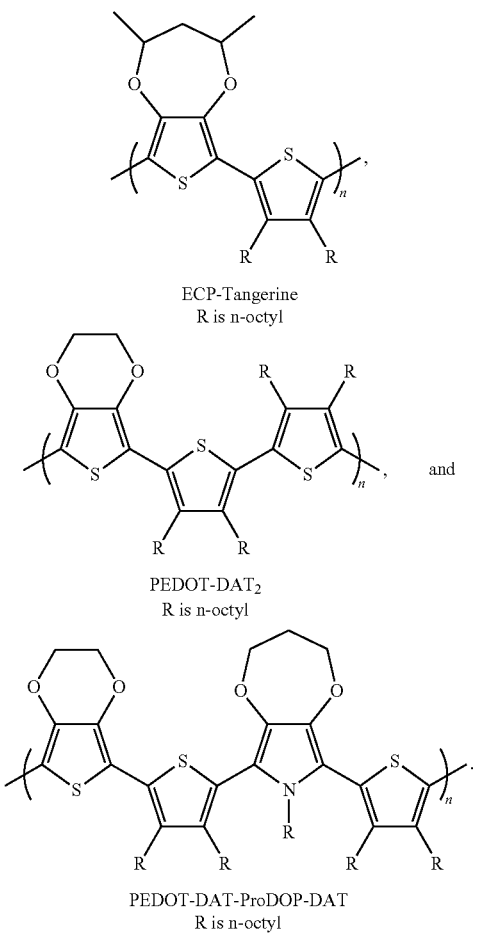

ECP-Tangerine
R is n-octyl

PEDOT-DAT$_2$
R is n-octyl

, and

PEDOT-DAT-ProDOP-DAT
R is n-octyl

In an embodiment of the invention, the D unit has a substituent at $R^1$ and/or $R^2$ and at least one of $R^3$, $R^4$, $R^5$, $R^6$, $R^7$ and $R^8$ that is on the carbon α to the oxygen is not H. An exemplary $(DAr)_n$ copolymer, according to this embodiment of the invention, is ECP-Tangerine, shown below, which display the same absorbance maximum as PAcDOT$_2$-Ph but has an orange color because of a slightly broader absorption profile.

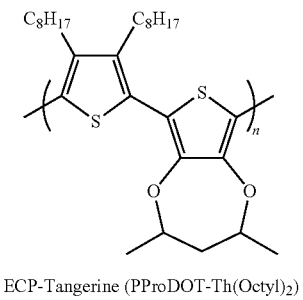

ECP-Tangerine (PProDOT-Th(Octyl)$_2$)

Figure 3:
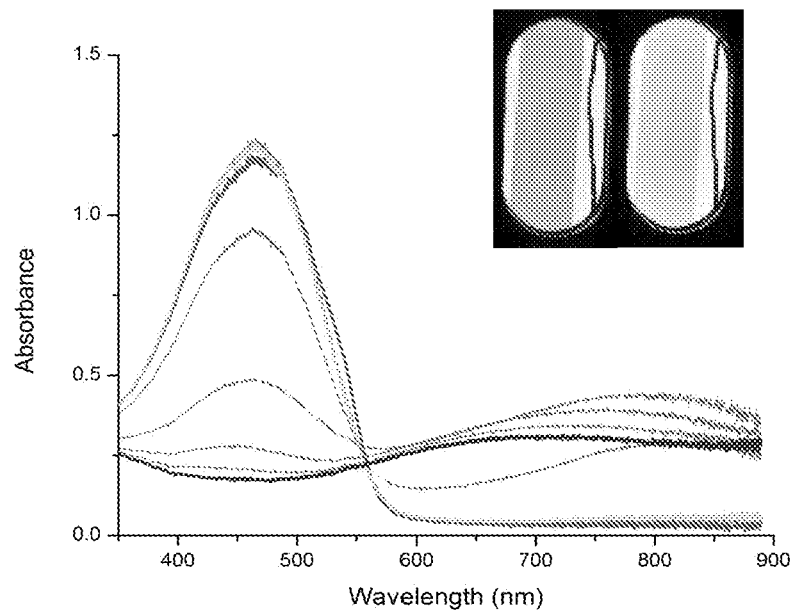
FIG. 3 shows absorbance spectra of poly(1,3-dimethyl-ProDOT-alt-3,4-dioctylthiophene) tangerine ECP, according to an embodiment of the invention, in its fully colored and bleached states when immersed in 0.5 M $TBAPF_6$/PC.
Figure 4:
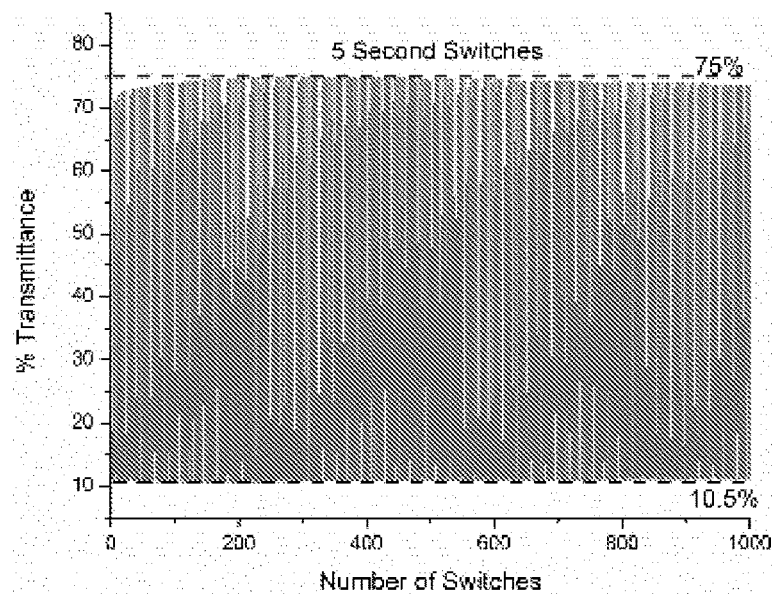
FIG. 4 shows the transmittance measured at 464 nm of films of poly(1,3-dimethylProDOT-alt-3,4-dioctylthiophene) in its fully oxidized and neutral states over the course of 1000 redox switches. Films were switched in 0.5 M $TBAPF_6$/PC with repeated square-wave potential steps, holding for 5 s in the oxidized and neutral states.

This 1,3-dimethyl substituted PProDOT-Th(Octyl)$_2$ tangerine ECP has sufficient strain to achieve a vibrant orange color yet retains a low oxidation potential (colorless by 0.5 V vs. Fc/Fc$^+$), as shown in FIG. 3, comparable to that of ECP-Magenta and ECP-Cyan and with similar contrast 65% ΔT for ECP-Tangerine, vs ECP-Magenta 70% ΔT and ECP-Cyan 50% ΔT. The stability is enhanced, exhibiting minimal loss in contrast when switched between its fully colored and colorless states for 1000 cycles for a thin film, in 0.5 M TBAPF$_6$-propylene carbonate, as shown in FIG. 4.

In an embodiment of the invention, the $(D_2Ar_z)_n$ polymer has D unit that are alkylenedioxythiophenes, as indicated above, and Ar units that include, for example, dioxyselenophenes, dioxypyrroles, or dioxyfurans, but do not include dioxythiophenes, where the Ar units can be of the structures above and/or the structure:

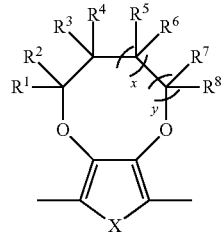

where: X is Se, O, or NR y is 0 or 1; and $R^1$, $R^2$, $R^3$, $R^4$, $R^5$, $R^6$, $R^7$, and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, CO$_2$H, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, NH$_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl) amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl) amino, $C_7$-$C_{30}$ di(arylalkyl)amino, $C_8$-$C_{30}$ alkyl(arylalkyl) amino, $C_{15}$-$C_{30}$ aryl(arylalkyl)amino, $C_8$-$C_{30}$ alkenyl(aryl) amino, $C_8$-$C_{30}$ alkynyl(aryl)amino, C(O)NH$_2$ (amido), $C_2$-$C_{30}$ alkylamido, $C_7$-$C_{14}$ arylamido, $C_8$-$C_{30}$ (arylalkyl) amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl (arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt.

Alternatively or additionally, when the D units are alkylenedioxythiophenes, the Ar repeating units for the $(D_2Ar_z)_n$ polymers can be of the structures above and/or structure:

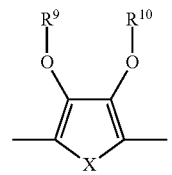

where: X is Se, O, or NR; R, $R^9$ and $R^{10}$ are independently $C_3$-$C_{30}$ alkyl, $C_3$-$C_{30}$ alkenyl, $C_3$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_3$-$C_{30}$ alkylester, $C_7$-$C_{15}$ arylester, $C_8$-$C_{30}$ alkylarylester, $C_4$-$C_{30}$ alkenylester, $C_4$-$C_{30}$ alkynylester, NH$_2$, $C_2$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl) amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl (aryl)amino, C(O)NH$_2$ (amido), $C_3$-$C_{30}$ alkylamido, $C_7$-$C_{14}$ arylamido, $C_8$-$C_{30}$ (arylalkyl)amido, $C_3$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, or $C_4$-$C_{14}$ tetraalkyammonium salt.

In embodiments of the invention the yellow or orange high gap conjugated polymer sequence is a portion of a block copolymer, graft copolymer, or polymer network where non-conjugated polymer portion(s) can be any polymer that can be prepared by a step-growth or chain-growth process. For example, as can be appreciated by one skilled in the art, a triblock copolymer can be formed where a non-coloring polymer mono-terminated with either or both of the alternating units can be employed as end-capping monofunctional units in a condensation polymerization with a plurality of difunctional monomers for the yellow conjugated polymer's alternating sequence containing portion according to an embodiment of the invention. In another embodiment of the invention, a non-conjugated polymer can be terminated at both ends with one of either of the monomers for the high gap EC portion to form a multiblock polymer upon condensation with the appropriate proportions of the two monomers for the yellow conjugated polymer portion. In another embodiment of the invention a non-conjugated polymer with substitution of one of the complementary monomers of the conjugated polymer portion can be condensed with yellow conjugated polymer forming monomers to yield graft-like or network copolymers. The yellow conjugated polymer segments can be formed before, during or after the formation of the non-conjugated polymer portion of block copolymers, as can be appreciated by one skilled in the art.

In embodiments of the invention, the yellow or orange high gap ECP can be transformed into a different polymer, by reactions on the conjugated polymer portion. For example, but not limited to, the reaction can be a transformation of the substituents on one or more of the alternating repeating units. In some embodiments of the invention the yellow conjugated polymer can contain, for example, a reactive ProDOT of structure, as shown in structure I above, where $R^1$ through $R^6$ groups permit processing of the yellow conjugated polymer into a film that can be subsequently converted to a different yellow conjugated polymer and, for example, a soluble film can be converted into an insoluble film. For example, where $R^3$ and $R^4$ are di-ester groups, conversion to carboxylic acid groups can be carried out in the manner disclosed in Reynolds et al. U.S. Pat. No. 7,799,932, Sep. 21, 2010, and incorporated by reference herein. If desired, the di-acid can be subsequently converted into a carboxylate salt. Reactions can also involve one or more units of the other polymeric segments of block copolymers other than those of the conjugated polymer portion. Repeating units or terminal ends of the yellow conjugated polymer can be substituted to promote self associate or cross-associate with plurally functional additives to form a super-molecular structure through non-covalent interactions such as hydrogen bonding, ion-dipole, ion pairing, ion chelation, dipole-dipole, or other non-covalent bonding forces. For example, some repeating units may be substituted with specific polyol groups that are readily solvated by a solvent, but strongly associate specifically with one or more other polyol groups of the yellow conjugated polymer or of an additive upon removal of the solvent to form a super-molecular yellow conjugated polymer complex. In some embodiments of the invention, the polymer having a yellow conjugated polymer portion can be cross-linked, for example after deposition on a surface that will be part of a device, for example, an electrochromic device. For example, repeating units of the polymer can have a functional group that can be induced to add to or condense with another group upon activation or initiation that is within the conjugated polymer or on a reagent that is difunctional or polyfunctional that is added to the yellow conjugated polymer. For example vinyl units can be induced to undergo vinyl addition, cyclic groups can be induced to undergo ring-opening addition, or complementary groups can undergo catalyzed addition or condensation to form a network. Functionalities that can be employed can be appreciated by those skilled in the art. For example, a precursor to a yellow conjugated polymer network can be deposited on a surface from solution and a catalyst, a reagent, heat or radiation can be used to cause network formation. In many cases a precursor to a yellow conjugated polymer network is a non-network yellow conjugated polymer according to an embodiment of the invention.

In an embodiment of the invention $(DAr)_n$ yellow or orange high gap ECP are prepared by cross-coupling reactions of an electrophilic 3,4-alkylenedioxythiophene substituted on the alkylene bridge (I) or 3,4-dialkoxythiophene unit (II) and a nucleophilic aromatic donor unit. This allows sufficient molecular weight where the fully conjugated limit of the π to π* transition is reached and the polymer can be solution processable as a yellow or orange film because reliable purifications of the nucleophilic monomer and the electrophilic monomer can be effectively carried out. As with virtually all cross-coupling step-growth polymerizations, the degree of polymerization is limited by any deviation from stoichiometry. Hence the purity of both monomers is critical to achieving a sufficiently large polymer for use in many viable electrochromic devices. The electrophilic monomers are substituted with leaving groups such as halogens, triflates, tosylates, mesylates, nosylates, trifluoroacetates or other substituted sulfonates that can act as the leaving group. In some embodiments of the invention the nucleophilic monomers can be substituted with tin or zinc moieties rather than boron moieties. Coupling reactions that can be used for the preparation of the yellow conjugated polymers, include, but are not restricted to: Suzuki coupling, Stille coupling, Kumada coupling, Hiyama coupling, Negishi coupling, direct arylation (DA) polymerization, Grignard methathesis (GRIM) and oxidation polymerization.

In embodiments of the invention the yellow or orange ECP can have tuned electrochromic features that permit a desired device fabrication method. In some embodiments of the invention the substituents comprise non-polar side chains. In other embodiments the substituents comprise polar or ionic side chains, including but not exclusive to: ether, ester, amide, carboxylic acid, sulfonate, and amine functionalized chains. By the incorporation of polar or ionic substituents, the yellow conjugated polymers can be designed to adsorb on metal or metal oxide surfaces, for example, but not limited to, titania, for use in dye sensitized solar cells (Graetzel Cells) or other devices. An electrochromic device can be formed by a layer-by-layer deposition process when a substituent that imparts solubility to the yellow or orange ECP is included with one or more other conjugated polymers that provide one or more different colors. In an embodiment of the invention, an ECD displays all colors by the subtractive color mixing of Cyan Magenta Yellow (CMYK) or Red Yellow Blue (RYB) conjugated polymers employing the yellow conjugated polymer, according to an embodiment of the invention. The desired colors can be achieved by: sequentially patterning the multiple colors (CMY or RYB) in a layered fashion to achieve color mixing; patterning in a lateral configuration, such that the patterned pixels are small enough and close enough that the human eye sees the adjacent colors as a mixture; or stacking as films on separate electrodes to mix colors. For example, the polymers of colors red, yellow, and blue can be patterned as clusters of squares, rectangles, circles, triangles, or other regular or irregular shapes, onto patterned electrode pixels to combine the colors at each pixel and allow the resulting observed color to be any color of the visible spectrum. For example, when the red and yellow polymers are in their neutral state, and the blue polymer is in a colorless oxidized state, the pixel displays the color orange, and, when the yellow and blue pixels are in the neutral state with the red pixel in a colorless oxidized state, the displayed color is green.

The yellow or orange ECPs according to embodiments of the invention can be employed in a wide variety of applications. For example, the ECPs can be a component of an active layer in bulk heterojunction solar cells. The R groups of the 3,4-dialkoxythiophene unit can be of a structure that directs and enhances adsorption of the yellow conjugated polymer to a metal oxide through a polar carboxylate or even phosphate functionalities for use in dye sensitized solar cells, where the yellow EC polymer functions as the active light absorbing layer. Other uses for the yellow or orange ECPs, according to embodiments of the invention are as charge transport layers and charge injection layers for field-effect transistor devices.

Methods and Materials

Polymer Synthesis and Characterization.

Figure 5A:
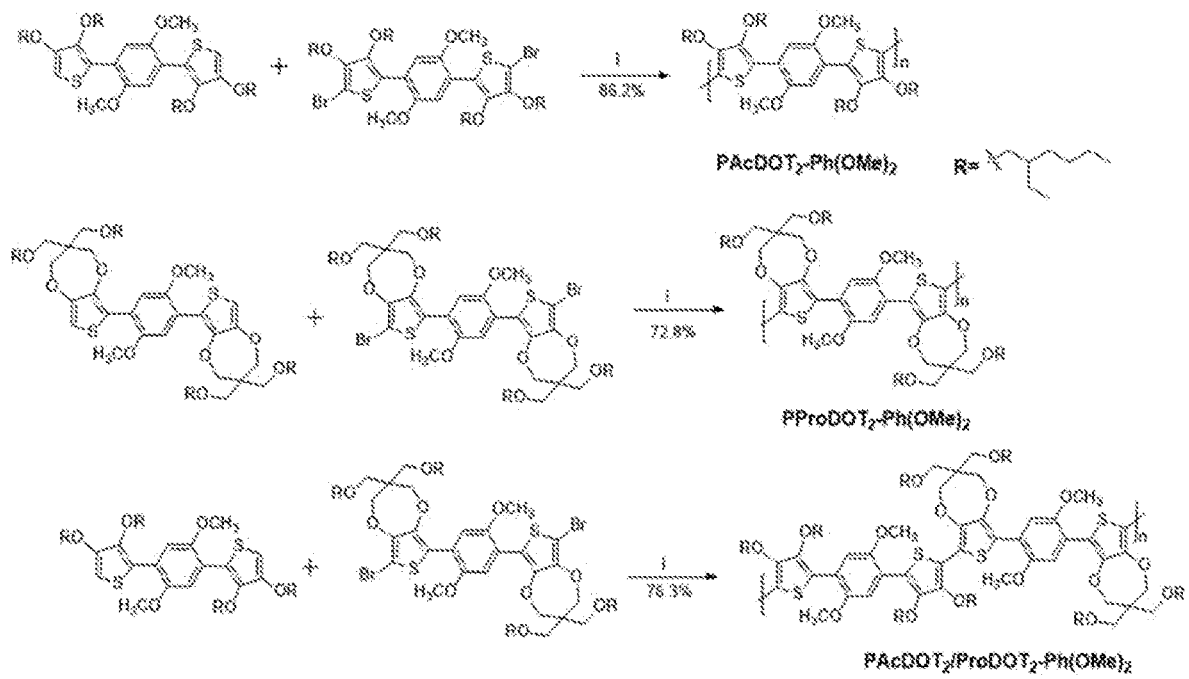
FIG. 5A shows a synthetic scheme for the preparation of $PAcDOT_2$-$Ph(OMe)_2$, $PProDOT_2$-$Ph(OMe)_2$, and $PAcDOT_2$/$PProDOT_2$-$Ph(OMe)_2$ using direct arylation polymerization, according to an embodiment of the invention.
Figure 5B:
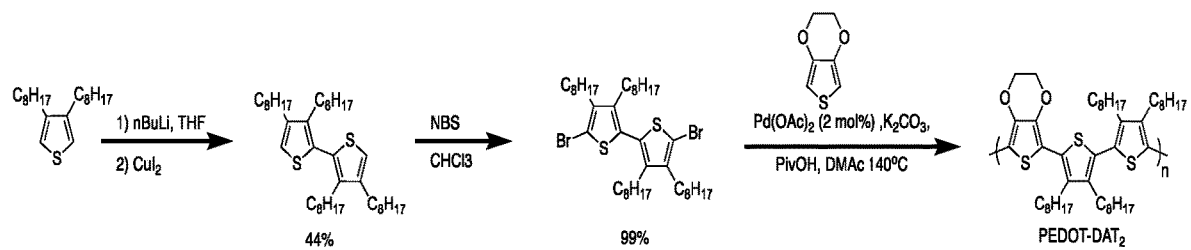
FIG. 5B shows a synthetic scheme for the preparation of PEDOT-$DAT_2$ using direct arylation polymerization, according to an embodiment of the invention.

PAcDOT$_2$-Ph(OMe)$_2$, PProDOT$_2$-Ph(OMe)$_2$, and PAcDOT$_2$/ProDOT$_2$-Ph(OMe)$_2$ were prepared by direct arylation (DA) polymerization as illustrated in FIG. 5A. PEDOT-DAT$_2$ was polymerized as shown in FIG. 5B. All the dimethoxyphenylene-based copolymers were obtained in high yields (>70%), with number average molecular weights ($M_n$) ranging from 24.1 to 60.2 kDa, and dispersities (Đ) ranging from 1.7 to 2.3 after Soxhlet extraction. All three polymers are highly soluble (>10 mg/mL) in common organic solvents including chloroform, THF, and toluene owing to the ethylhexyloxy chains on the DOT units. The thermal stability of the polymers was studied by TGA and found to be stable up to 320° C. Oxidative polymerization was also carried out using $AcDOT_2$-Ph(OMe)$_2$ with excess FeCl$_3$ in ethyl acetate at room temperature, and resulted in $PAcDOT_2$-Ph(OMe)$_2$ with a $M_n$ of 11.7 kDa and a dispersity of 3.9, but led to low yields around 20%, likely due to a large fraction of low molecular weight oligomers.

Electrochemical and Optical Properties of High-Gap ECPs.

The polymers in Scheme 1 possess various structural motifs that readily allow for fine-tuning of the optical and electronic properties. Variation of the arylene and DOT units to tune the electron-richness and/or the steric strain along the polymer backbone affects the onset of oxidation ($E_{ox}$) as shown in Table 1 and in the differential pulse voltammetry (DPV) results. By increasing the number of electron-rich DOTs in the repeat unit, the $E_{ox}$ is substantially lowered. The addition of a second ProDOT unit in PProDOT$_2$-Ph lowers the $E_{ox}$ by 260 mV compared to PProDOT-Ph. Similarly, by replacing the unsubstituted phenylene with the electron-rich dimethoxyphenylene in PAcDOT$_2$-Ph(OMe)$_2$ and PProDOT$_2$-Ph(OMe)$_2$, the $E_{ox}$ is lowered by 60-100 mV compared to PAcDOT$_2$-Ph and PProDOT$_2$-Ph. ProDOT units have been shown to have less steric hindrance than AcDOT units, leading homopolymers of the former to have a more relaxed backbone, a longer effective conjugation length, and a lower $E_{ox}$. This trend is preserved here, as can be observed when comparing the oxidation potential and optical band gaps in films of PProDOT$_2$-Ph(OMe)$_2$ and PProDOT$_2$-Ph with PAcDOT$_2$-Ph(OMe)$_2$ and PAcDOT$_2$-Ph, respectively. Fine control of redox properties and spectra is demonstrated with the copolymer (PAcDOT$_2$/ProDOT$_2$-Ph(OMe)$_2$), where films of PAcDOT$_2$/ProDOT$_2$-Ph(OMe)$_2$ have an $E_{ox}$ and absorption maximum in between PAcDOT$_2$-Ph(OMe)$_2$ and ProDOT$_2$-Ph(OMe)$_2$. The redox and absorbance profiles do not appear to be simply an overlap from those of the parent polymers, indicating that the film properties are derived from the novel AcDOT$_2$-Ph(OMe)$_2$-ProDOT$_2$-Ph(OMe)$_2$ repeat units indicating that redox and optical properties can be readily modified by adjusting the ratio of AcDOT and ProDOT along the copolymer backbone.

TABLE 1

Optical and Electrochemical Properties of the ECPs Studied

| Polymer | $E_{ox}{}^a$ (mV vs. Fc/Fc$^+$) | $\lambda_{max}{}^b$ (nm) | $E_g{}^b$ (eV) |
|---|---|---|---|
| PProDOT-Ph | 451 | 448 | 2.38 |
| PProDOT$_2$-Ph | 191 | 488 | 2.16 |
| PProDOT$_2$-Ph(OMe)$_2$ | 126 | 500 | 2.15 |
| PAcDOT$_2$-Ph | 438 | 464 | 2.27 |
| PAcDOT$_2$-Ph(OMe)$_2$ | 330 | 446 | 2.37 |
| PAcDOT$_2$/ProDOT$_2$-Ph(OMe)$_2$ | 220 | 476 | 2.24 |

$^a$As determined by DPV as the onset of the current for oxidation.
$^b$For films cast onto ITO coated glass.

Figure 6:
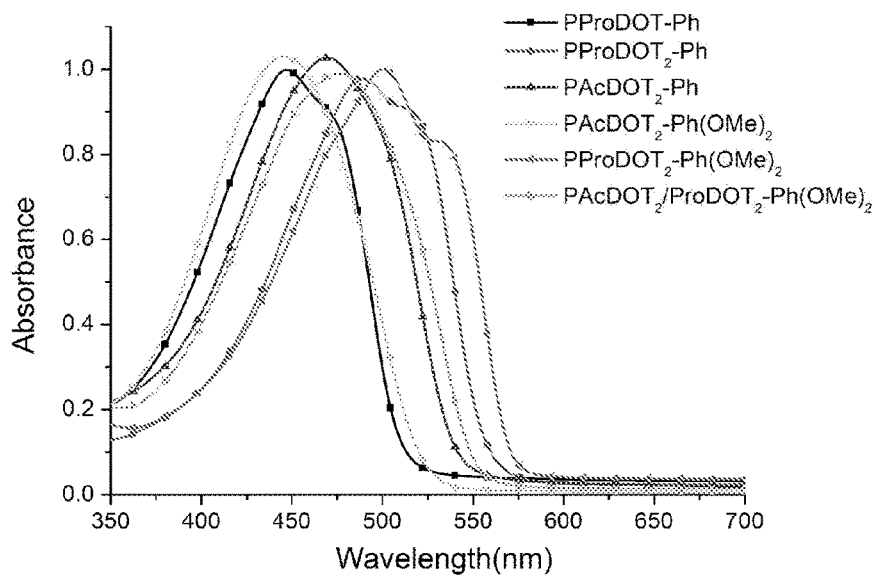
FIG. 6 shows the neutral state spectra of high bandgap ECP films, according to an embodiment of the invention, on ITO-coated glass in 0.5 M $TBAPF_6$/PC electrolyte solution for films sprayed to an absorbance of 1.00±0.03.

The optical properties of polymer solutions and spray-cast thin films are shown in FIG. 6. The optical properties of methoxy-substituted phenylene containing ECPs, according to embodiments of the invention, differ from their unsubstituted analogs. For example, PAcDOT$_2$-Ph(OMe)$_2$ has a higher band gap than PAcDOT$_2$-Ph, however PProDOT$_2$-Ph(OMe)$_2$ has a lower band gap than PProDOT$_2$-Ph. The AcDOT comprising ECPs with relatively bulky and electron-rich methoxy units in place of the smaller hydrogen atom on the phenylene ring has a significant effect on the backbone planarity/sterics because the side-chains on the AcDOTs extend along the plane of the backbone, which can interact with the methoxy groups. The resulting torsional strain along the backbone causes a decrease in conjugation, with an accompanying increase in the band gap giving rise to a more yellow color. In the case of the ProDOT containing polymers, the addition of the methoxy groups play a smaller role in steric interactions as the side-chains are not only located further from the methoxy groups but they are also orthogonal to the plane of the backbone and, as a result, do not interact with them to a high degree. The electron-richness of the methoxy groups also affect the HOMO and lower the band gap for PProDOT$_2$-Ph(OMe)$_2$ relative to its unsubstituted analog. This demonstrates that the steric and electronic effects observed here are intertwined, and depend upon the neighboring groups present, and not just on the substituents themselves.

Color and Switching Properties of High Gap ECPs.

Figure 7A:
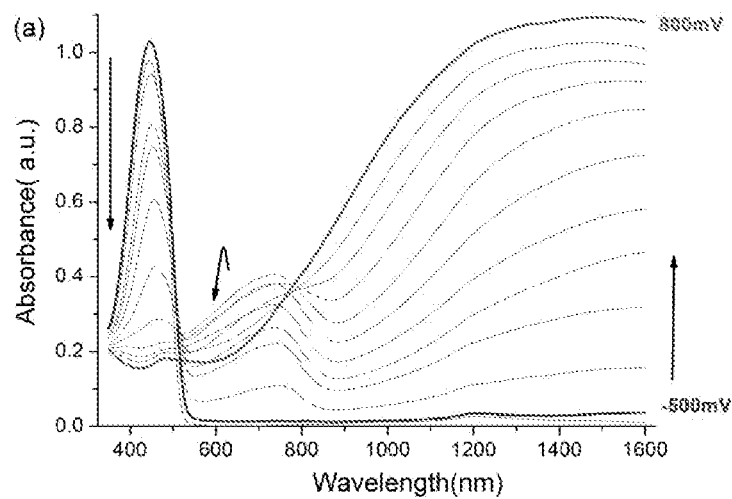
FIG. 7A shows the absorbance spectroelectrochemistry of $PAcDOT_2$-$Ph(OMe)_2$, according to an embodiment of the invention, where applied potential, as shown by the arrow, was increased in 10-50 mV steps between the fully colored and bleached states in 0.5 M $TBAPF_6$/PC.
Figure 7B:
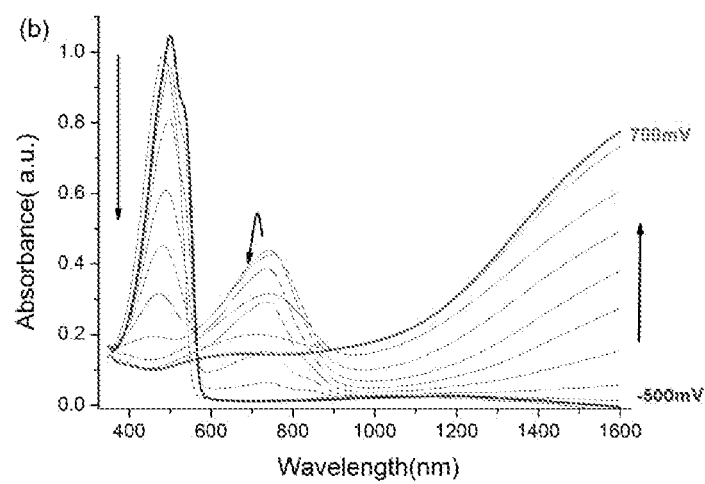
FIG. 7B shows the absorbance spectroelectrochemistry of $PProDOT_2$-$Ph(OMe)_2$, according to an embodiment of the invention, where applied potential, as shown by the arrow, was increased in 10-50 mV steps between the fully colored and bleached states in 0.5 M $TBAPF_6$/PC.
Figure 7C:
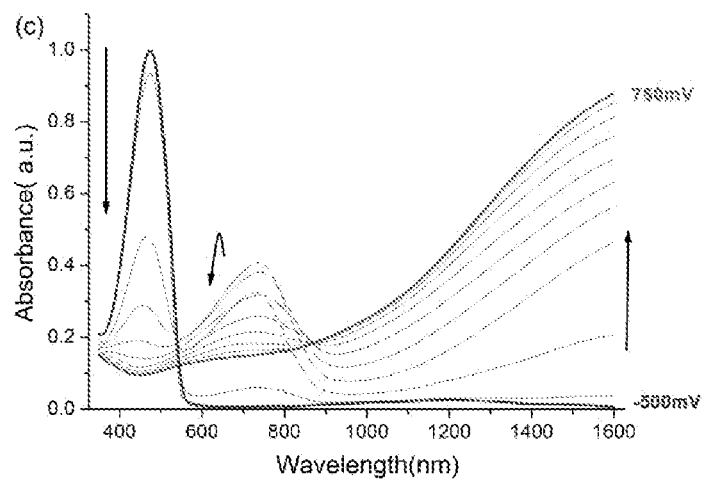
FIG. 7C shows the absorbance spectroelectrochemistry of $PAcDOT_2$/$PProDOT_2$-$Ph(OMe)_2$, according to an embodiment of the invention, where applied potential, as shown by the arrow, was increased in 10-50 mV steps between the fully colored and bleached states in 0.5 M $TBAPF_6$/PC.
Figure 7D:
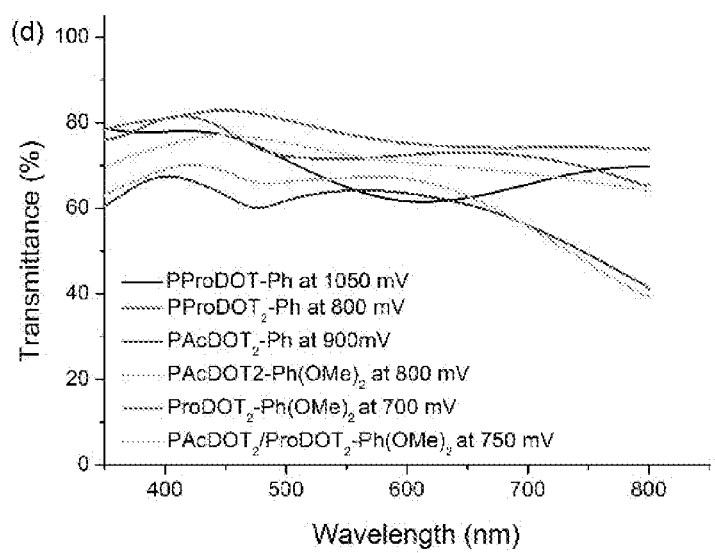
FIG. 7D shows overlaying transmittance spectra (%) of the oxidized forms of PProDOT-Ph, $PAcDOT_2$-Ph, $PProDOT_2$-Ph, $PAcDOT_2$-$Ph(OMe)_2$, $PProDOT_2$-$Ph(OMe)_2$, and $PAcDOT_2$/$PProDOT_2$-$Ph(OMe)_2$ for films spray-cast onto ITO coated glass to an absorbance of 1.00±0.03, according to an embodiment of the invention.

The switching properties of the polymer films are evaluated by monitoring the absorption changes upon electrochemical oxidation. The spectra of the Ph(OMe)$_2$-based polymers are shown in FIG. 7A. As the potential is increased, the π-π* absorption bands (350–550 nm) are depleted, while absorption bands originating from polaronic and bipolaronic charge carriers appear. The charge carrier bands for the PAcDOT-based ECPs are blue-shifted ($\lambda_{max}$: 1400-1500 nm) compared to the ProDOT-analogs ($\lambda_{max}$: >1700 nm, FIG. 7B and FIG. 7C). This results in some tailing into the visible range for the former, slightly compromising the long-wavelength transmissivity—and by extension the color neutrality—of the fully oxidized state as shown in FIG. 7C (blue and green lines). When comparing polymers containing phenyl groups with the dimethoxy-substituted analogs, the low energy charge carrier band is further red-shifted as a result of the incorporation of the electron-rich methoxy groups. The PAcDOT$_2$/ProDOT$_2$-Ph(OMe)$_2$ displays a neutral state more closely resembling PAcDOT$_2$-Ph(OMe)$_2$ but an oxidized state resembling PProDOT$_2$-Ph(OMe)$_2$. The charge carrier band between 700 and 800 nm is not particularly affected by the choice of DOT unit or the substitution pattern on the phenylene ring.

The maximum contrast and the quantified colors of the ECP films, according to embodiments of the invention, in the neutral and oxidized states is provided in Table 2, below. Of the ECPs, PProDOT$_2$-Ph(OMe)$_2$ exhibited the highest contrast (70 Δ % T at 500 nm) and the most transmissive oxidized state followed by the copolymer PAcDOT$_2$/ProDOT$_2$-Ph(OMe)$_2$. PProDOT-Ph reaches a similar contrast as the copolymer if measured at $\lambda_{max}$, however, across the visible spectrum the color neutrality is compromised by a residual absorbance at the long wavelength edge of the visible. The polymers containing ProDOT units, with spectra shown in FIG. 7B and FIG. 7C, exhibit higher optical contrasts than their AcDOT analogs. The lower contrast of the AcDOT-based polymers can be ascribed to the lower degree of planarity due to steric hindrance which makes it energetically more difficult to fully planarize upon electrochemical oxidation as well as a result of charge carrier bands that tail into the visible. The contrast of the copolymer PAcDOT$_2$/ProDOT$_2$-Ph(OMe)$_2$ is higher than PAcDOT$_2$-Ph(OMe)$_2$, and only slightly lower than PProDOT$_2$-Ph(OMe)$_2$. The contrast values at $\lambda_{max}$ increase with the incorporation of ProDOT units as the steric twist is reduced and the electron-richness increased. Incorporating the electron-rich-Ph(OMe)$_2$ moiety leads to an increase in the Δ % T compared to the unsubstituted analogs, due in part to the red-shifting these charge carrier bands exhibit, as well as the presence of favorable S—O interactions between neighboring XDOTs and the methoxy groups on phenylene, allowing for a higher degree of planarity when fully oxidized.

TABLE 2

L*a*b* color coordinates for all ECPs in the neutral and transmissive states and total change in contrast upon switching between the extremes.

| Polymer | Δ % T$^a$ (at $\lambda_{max}$) | neutral state L*, a*, b* color coordinates$^b$ | oxidized state L*, a*, b* color coordinates$^b$ |
|---|---|---|---|
| PProDOT-Ph | 67 | 96, −8, 78 | 86, −1, −8 |
| PProDOT$_2$-Ph | 62 | 84, 35, 50 | 89, 2, −3 |
| PAcDOT$_2$-Ph | 51 | 87, 9, 76 | 87, 2, 4 |
| PAcDOT$_2$-Ph(OMe)$_2$ | 59 | 89 −4, 85 | 81, −1, −1 |
| PProDOT$_2$-Ph(OMe)$_2$ | 70 | 80, 47, 36 | 91, −1, −4 |
| PAcDOT$_2$/ProDOT$_2$-Ph(OMe)$_2$ | 66 | 87, 21, 73 | 88, −1, −3 |

$^a$Difference between steady-state transmittance measured at fully oxidized and fully neutral states (all films sprayed to 10% at $\lambda_{max}$);
$^b$For a film cast onto ITO coated glass.

Figure 8A:
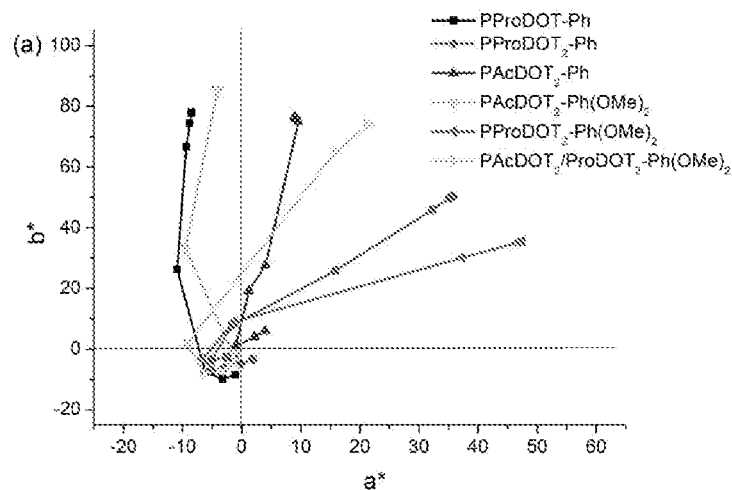
FIG. 8A shows plots of CIE 1976 a*b* color coordinates, for ECPs according to embodiments of the invention, at increasing applied potentials in 0.1 V steps from neutral (0 V, all values in FIG. 8 vs. $Ag/Ag^+$ where $Ag/Ag^+$=0.125 V vs. Fc/Fc+) to fully oxidized (1.05 V for PProDOT-Ph, 0.8 V for $PProDOT_2$-Ph, 0.9 V for $PAcDOT_2$-Ph, 0.8 V for $PAcDOT_2$-$Ph(OMe)_2$, 0.7 V for $PProDOT_2$-$Ph(OMe)_2$, 0.75 V for $PAcDOT_2$/$PProDOT_2$-$Ph(OMe)_2$) states, in 0.5 M $TBAPF_6$/PC of films spray-cast onto ITO/glass electrodes, where the polymer neutral states are furthest from the origin and the values track toward the origin as the polymer is oxidized to the bleached state.
Figure 8B:
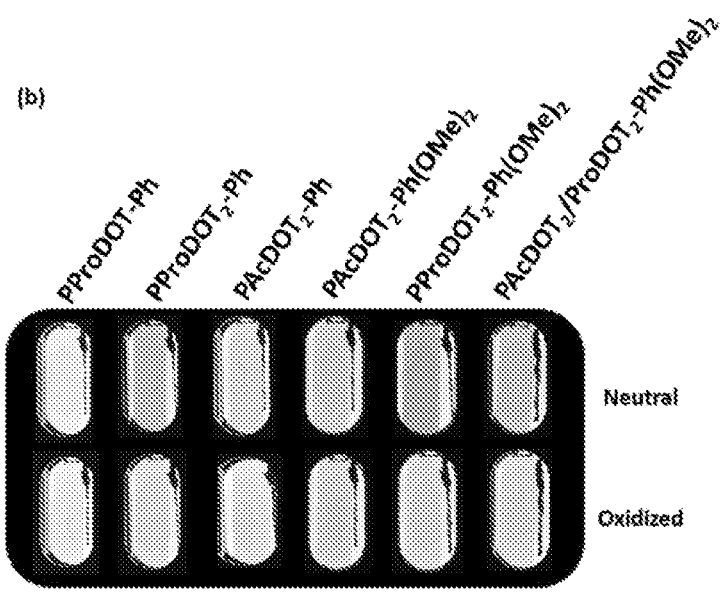
FIG. 8B shows photographs of the fully neutral and fully oxidized films of the yellow and orange ECPs according to embodiments of the invention.

The colors of the ECPs can be quantified by converting the spectra into L*a*b* color coordinates where the L* represents the lightness-darkness of a given color, a* the red-green balance, and the b* the yellow-blue balance. The L*a*b* coordinates for the neutral and oxidized states are summarized in Table 2. FIG. 8A shows how the a*b* values of the respective polymers change upon electrochemical oxidation, while FIG. 8B shows the photographs of the polymers in their fully colored and fully colorless states. ProDOT-Ph, PAcDOT$_2$-Ph and PAcDOT$_2$-Ph(OMe)$_2$ all have a vibrant yellow color as confirmed by their low a* values and high b* values. Of the three, PAcDOT$_2$-Ph (OMe)$_2$ is the purest yellow, having the highest b* and lowest a*. In addition to being the most vibrant yellow, it has the lowest oxidation potential of the three, 250 mV lower than ProDOT-Ph which is otherwise very similar in color. By replacing the AcDOTs with ProDOTs, the steric hindrance between chains is reduced, leading to a more relaxed backbone. This in turn causes the neutral state color of PProDOT$_2$-Ph(OMe)$_2$ and ProDOT$_2$-Ph to have a slightly red-shifted absorption profile translating into the colors having a substantial a* component, placing them in the orange color space. The color of the copolymer PAcDOT$_2$/ProDOT$_2$-Ph(OMe)$_2$ falls right in between the two other ECPs, giving it a warm golden-yellow hue. Upon oxidation, all polymers reach a color neutral transmissive state as indicated by the low a* b* values in Table 2.

Switching Kinetics of High Gap ECPs.

Figure 9A:
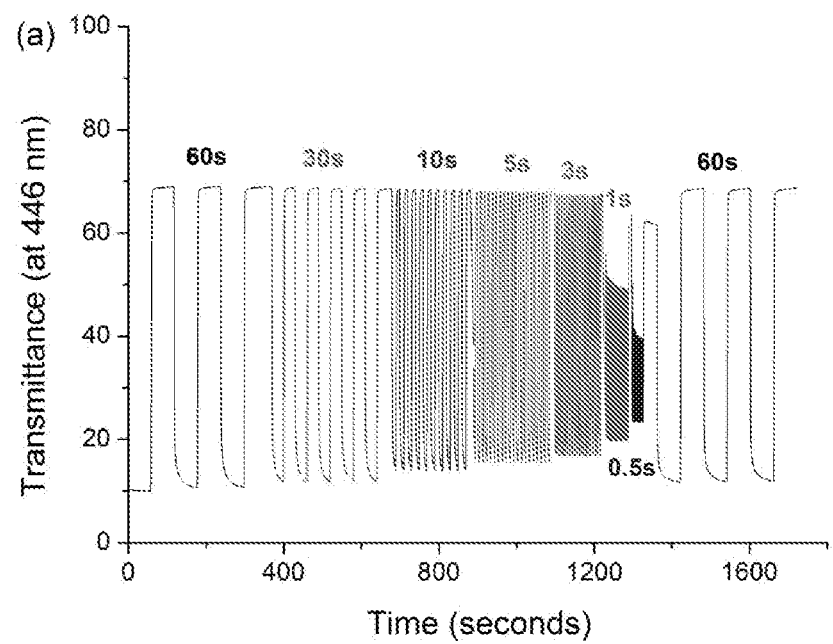
FIG. 9A shows the chronoabsorptometry of $PAcDOT_2$-$Ph(OMe)_2$ in 0.5 M $TBAPF_6$/PC electrolyte solution measured at 446 nm from −0.5 to 0.8 V, all values in FIG. 9 vs. $Ag/Ag^+$ where $Ag/Ag^+$=0.125 V vs. $Fc/Fc^+$.
Figure 9B:
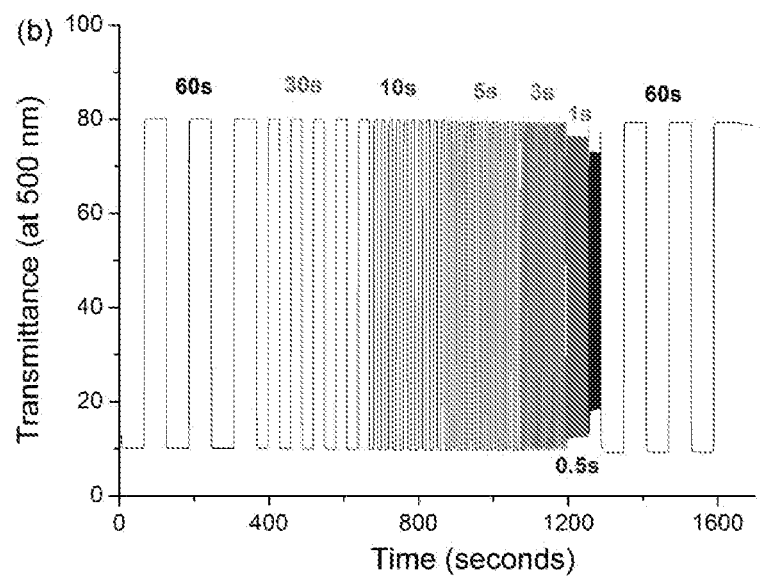
FIG. 9B shows the chronoabsorptometry of $PProDOT_2$-$Ph(OMe)_2$ in 0.5 M $TBAPF_6$/PC electrolyte solution measured at 500 nm from −0.5 to 0.7 V vs. $Ag/Ag^+$.
Figure 9C:
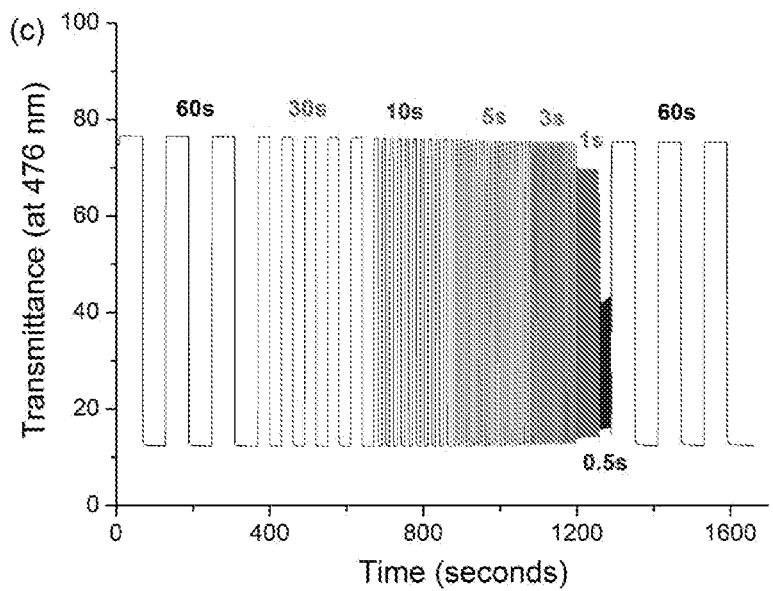
FIG. 9C shows the chronoabsorptometry of $PAcDOT_2$/$PProDOT_2$-$Ph(OMe)_2$ in 0.5 M $TBAPF_6$/PC electrolyte solution measured at 476 nm from −0.5 to 0.75 V vs. $Ag/Ag^+$.
Figure 10:
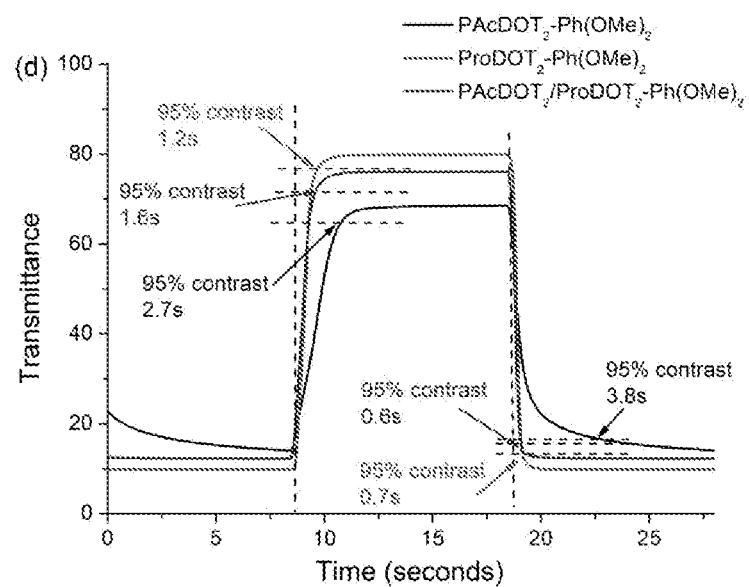
FIG. 10 shows the transmittance measured at a single wavelength for films of PAcDOT$_2$-Ph(OMe)$_2$, PProDOT$_2$-Ph(OMe)$_2$ and PAcDOT$_2$/ProDOT$_2$-Ph(OMe)$_2$ switched between their neutral and fully oxidized states. The time to reach 95% of the full optical contrast upon bleaching and coloration are indicated.

To evaluate the rate at which the bleaching/coloration processes occur in spray-cast films, the transmittance change at $\lambda_{max}$ was monitored as a function of time by applying square-wave potential steps for periods of 60, 30, 10, 5, 3, 1 and 0.5 s, as shown in FIGS. 9A, 9B and 9C. The two AcDOT containing ECPs (PAcDOT$_2$-Ph(OMe)$_2$ and PAcDOT$_2$-Ph) complete 95% of a full switch between 2 and 3 seconds, while the ProDOT-containing ECPs exhibit faster switching kinetics, all undergoing a full switch in a second or less. The slightly slower switching speeds of the AcDOT-based polymers compared with their ProDOT-based analogs is more clearly delineated in FIG. 10, which shows an overlap of the chronoabsorptometry curves during a 10 second switch.

Figure 11:
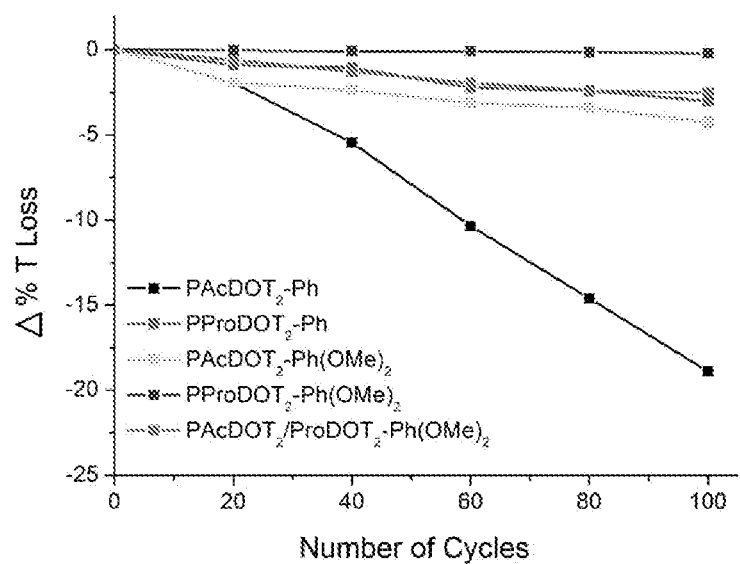
FIG. 11 shows plots of contrast loss versus number of switching cycles in 0.5 M TBAPF$_6$/PC electrolyte solution with repeated square-wave potential steps of 10 s for PAcDOT$_2$-Ph measured at 464 nm from −0.5 to 0.9 V, all values in FIG. 11 vs. Ag/Ag$^+$ where Ag/Ag$^+$=0.125 V vs. Fc/Fc$^+$, PProDOT$_2$-Ph measured at 488 nm from −0.5 to 0.8 V vs. Ag/Ag$^+$, PAcDOT$_2$-Ph(OMe)$_2$ measured at 446 nm from −0.5 to 0.7 V vs. Ag/Ag$^+$, PProDOT$_2$-Ph(OMe)$_2$ measured at 500 nm from −0.5 to 0.8 V vs. Ag/Ag$^+$, and PAcDOT$_2$/ProDOT$_2$-Ph(OMe)$_2$ measured at 476 nm from −0.5 to 0.75 V vs. Ag/Ag$^+$.

The contrast (Δ % T) of the films was monitored with repeated square-wave potential steps of 10 s, switching between the fully reduced and fully oxidized states for 100 cycles under ambient laboratory conditions. As shown in FIG. 11, when comparing PAcDOT$_2$-Ph(OMe)$_2$ with PAcDOT$_2$-Ph, the presence of the methoxy units leads to an increase in redox stability, with the unsubstituted analog losing 20% of contrast over the course of 100 cycles, while the methoxy-substituted analog loses 4%. This trend is less pronounced but still evident for the ProDOT containing polymers, where PProDOT$_2$-Ph loses 3% contrast over the course of 100 cycles whereas PProDOT$_2$-Ph(OMe)$_2$ only loses 0.3%. This improvement enhancement upon methoxy substitution can be attributed to unsubstituted phenylene rings being more susceptible to irreversible crosslinking or chemical degradation during repeated electrochemical switching. In addition, improved stability is observed over prolonged redox switching with the incorporation of ProDOT units. From this family of polymers, the orange PProDOT$_2$-Ph(OMe)$_2$ shows the greatest redox stability with ca. 18% loss in contrast over 1000 switches. Over the course of 1000 switches, a red-shifting of the spectra is observed, as well as a large decrease in switching speeds, requiring approximately 1 minute to switch to the fully colored state. When afforded enough time to switch, the colored and colorless states could be fully recovered even after several thousand redox cycles. The copolymer PAcDOT$_2$/ProDOT$_2$-Ph(OMe)$_2$ and the yellow PAcDOT$_2$-Ph(OMe)$_2$ afford similar redox stabilities over 100 cycles, but the copolymer exhibits a noticeably higher contrast even though this comes at the expense of the purity of the yellow color.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A conjugated polymer, comprising a (D$_2$Ar$_z$)$_n$ fully conjugated polymeric sequence of two donor (D) repeating units with at least one aromatic (Ar) repeating unit provided therebetween, each donor (D) repeating unit comprising an alkylenedioxyheterocycle;

each aromatic (Ar) repeating unit comprising an aromatic hydrocarbon, thiophene, furan, pyrrole, selenophene, or any combination thereof having at least one substituent of at least 5 atoms on a carbon α to the carbon attached to an adjacent D repeating unit of the conjugated polymer, wherein z is 1 to 3, n is 6 to 10,000, wherein the conjugated polymer is yellow or orange in its neutral state and has an absorption maximum between 300 and 500 nm that upon oxidation is color neutral between 400-750 nm, wherein the alkylenedioxyheterocycle is of the structure:

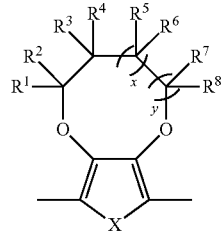

where:
X is S, Se, O, NR;
x is 0 or 1;
y is 0 or 1;
$R^1$, $R^3$, $R^5$, and $R^7$ are independently $C_1$-$C_{30}$ alkyl, $C_2$-$C_{30}$ alkenyl, $C_2$-$C_{30}$ alkynyl, $C_{14}$ aryl, $C_7$-$C_{30}$ arylalkyl, $C_8$-$C_{30}$ arylalkenyl, $C_8$-$C_{30}$ arylalkynyl, hydroxyl, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt; and
$R^2$, $R^4$, $R^6$, and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxyl, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt, and
where R is $C_3$-$C_{30}$ alkyl, $C_3$-$C_{30}$ alkenyl, $C_3$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_3$-$C_{30}$ alkylester, $C_7$-$C_{15}$ arylester, $C_8$-$C_{30}$ alkylarylester, $C_4$-$C_{30}$ alkenylester, $C_4$-$C_{30}$ alkynylester, $NH_2$, $C_2$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_3$-$C_{30}$ alkylamido, $C_7$-$C_{14}$ arylamido, $C_8$-$C_{30}$ (arylalkyl)amido, $C_3$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, or $C_4$-$C_{14}$ tetraalkyammonium salt.

2. A conjugated polymer, comprising a $(D_2Ar_z)_n$ fully conjugated polymeric sequence of two donor (D) repeating units with at least one aromatic (Ar) repeating unit provided therebetween,
each donor (D) repeating unit comprising an arylenedioxyheterocycle; and
each aromatic (Ar) repeating unit comprising an aromatic hydrocarbon, thiophene, furan, pyrrole, selenophene, or any combination thereof having at least one substituent of at least 5 atoms on a carbon α to the carbon attached to an adjacent D repeating unit of the conjugated polymer, wherein z is 1 to 3, n is 6 to 10,000,
wherein the conjugated polymer is yellow or orange in its neutral state and has an absorption maximum between 300 and 500 nm that upon oxidation is color neutral between 400-750 nm, wherein the arylenedioxyheterocycle is of the structure:

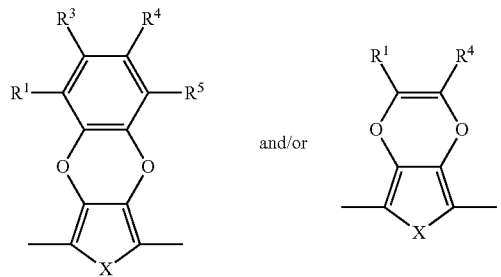

and/or where:
X is S, Se, O, or NR; and
R, R³, R⁴, and R⁵ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_2$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_3$-$C_{30}$ alkylamino, $C_6$-$C_{14}$ arylamino, $C_7$-$C_{30}$ (arylalkyl)amino, $C_3$-$C_{30}$ alkenylamino, $C_3$-$C_{30}$ alkynylamino, $C_8$-$C_{30}$ (arylalkenyl)amino, $C_8$-$C_{30}$ (arylalkynyl)amino, $C_3$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino, $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_2$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_2$-$C_{30}$ carboxylate salt, thiocarboxylate salt, dithiocarboxylate salt or $C_4$-$C_{14}$ tetraalkylammonium salt.

3. The conjugated polymer of claim 1, wherein the Ar repeating units are of the structure:

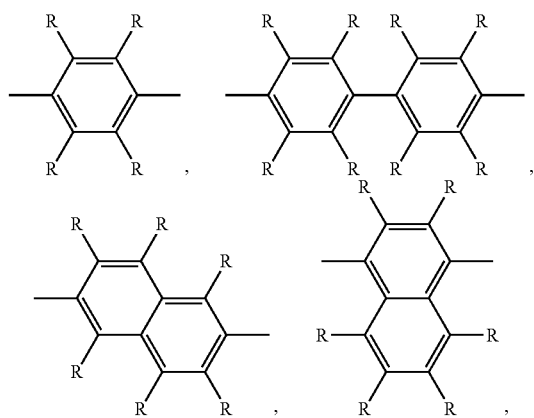

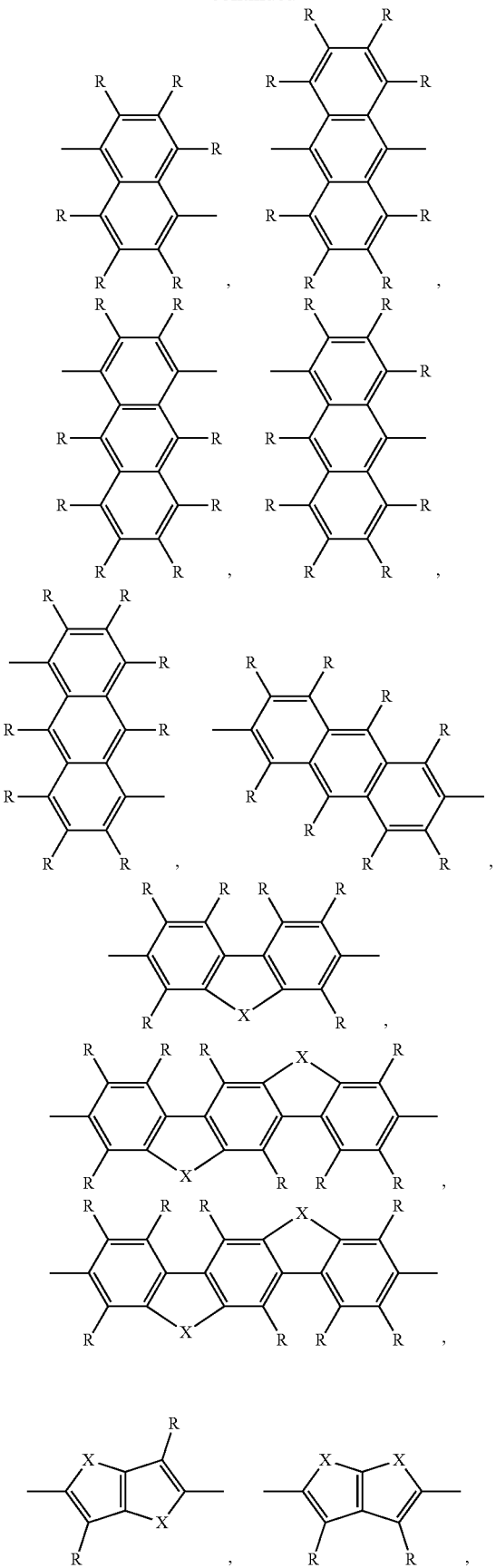

-continued

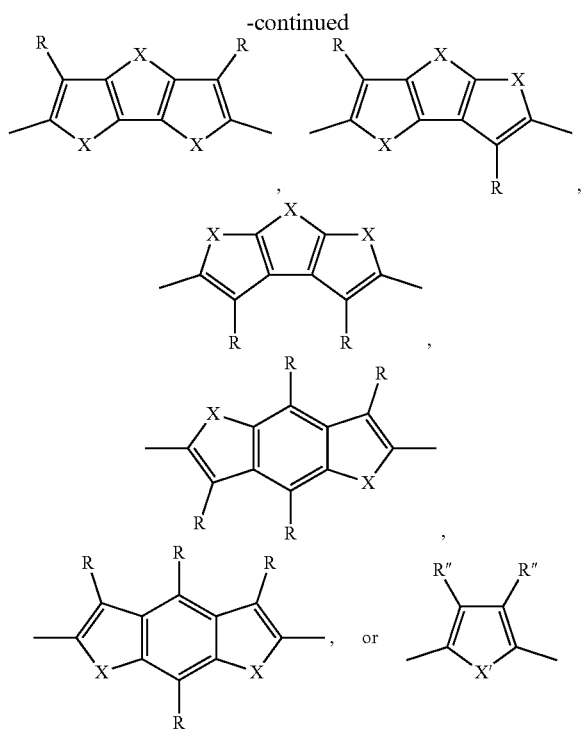

where: X is NR', PR', S, O, Se, SO$_a$, CR$_2$, SiR'$_2$, GeR'$_2$, or BR', where a=1 or 2; X' is NR', O, Se, or S; where R' is H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, C$_1$-C$_{30}$ hydroxyalkyl, C$_6$-C$_{14}$ hydroxyaryl, C$_7$-C$_{30}$ hydroxyarylalkyl, C$_3$-C$_{30}$ hydroxyalkenyl, C$_3$-C$_{30}$ hydroxyalkynyl, C$_8$-C$_{30}$ hydroxyarylalkenyl, C$_8$-C$_{30}$ hydroxyarylalkynyl, C$_3$-C$_{30}$ polyether, C$_3$-C$_{30}$ polyetherester, C$_3$-C$_{30}$ polyester, C$_3$-C$_{30}$ polyamino, C$_3$-C$_{30}$ polyaminoamido, C$_3$-C$_{30}$ polyaminoether, C$_3$-C$_{30}$ polyaminoester, C$_3$-C$_{30}$ polyamidoester, C$_3$-C$_{30}$alkyl sulfonic acid, C$_3$-C$_{30}$ alkyl sulfonate salt, C$_1$-C$_{30}$ alkylcarboxylate salt, C$_1$-C$_{30}$ alkylthiocarboxylate salt, C$_1$-C$_{30}$ alkyldithiocarboxylate salt or C$_3$-C$_{30}$ alkyl C$_4$-C$_{14}$ tetraalkylammonium salt; R" is independently H, C$_1$-C$_{30}$ alkyl, C$_3$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl; and R is independently H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, hydroxy, C$_1$-C$_{30}$ alkoxy, C$_6$-C$_{14}$ aryloxy, C$_7$-C$_{30}$ arylalkyloxy, C$_2$-C$_{30}$ alkenyloxy, C$_2$-C$_{30}$ alkynyloxy, C$_8$-C$_{30}$ arylalkenyloxy, C$_8$-C$_{30}$ arylalkynyloxy, CO$_2$H, C$_2$-C$_{30}$ alkylester, C$_7$-C$_{15}$ arylester, C$_8$-C$_{30}$ alkylarylester, C$_3$-C$_{30}$ alkenylester, C$_3$-C$_{30}$ alkynylester, NH$_2$, C$_1$-C$_{30}$ alkylamino, C$_6$-C$_{14}$ arylamino, C$_7$-C$_{30}$ (arylalkyl)amino, C$_2$-C$_{30}$ alkenylamino, C$_2$-C$_{30}$ alkynylamino, C$_8$-C$_{30}$ (arylalkenyl)amino, C$_8$-C$_{30}$ (arylalkynyl)amino, C$_2$-C$_{30}$ dialkylamino, C$_{12}$-C$_{28}$ diarylamino, C$_4$-C$_{30}$ dialkenylamino, C$_4$-C$_{30}$ dialkynylamino, C$_7$-C$_{30}$ aryl(alkyl)amino, C$_7$-C$_{30}$ di(arylalkyl)amino, C$_8$-C$_{30}$ alkyl(arylalkyl) amino, C$_{15}$-C$_{30}$ aryl(arylalkyl)amino, C$_8$-C$_{30}$ alkenyl(aryl)amino, C$_8$-C$_{30}$ alkynyl(aryl)amino C(O)NH$_2$ (amido), C$_2$-C$_{30}$ alkylamido, C$_7$-C$_{14}$ arylamido, C$_8$-C$_{30}$ (arylalkyl)amido, C$_2$-C$_{30}$ dialkylamido, C$_{12}$-C$_{28}$ diarylamido, C$_8$-C$_{30}$ aryl(alkyl)amido, C$_{15}$-C$_{30}$ di(arylalkyl) amido, C$_9$-C$_{30}$ alkyl(arylalkyl)amido, C$_{16}$-C$_{30}$ aryl(arylalkyl)amido, thiol, C$_1$-C$_{30}$ hydroxyalkyl, C$_6$-C$_{14}$ hydroxyaryl, C$_7$-C$_{30}$ hydroxyarylalkyl, C$_3$-C$_{30}$ hydroxyalkenyl, C$_3$-C$_{30}$ hydroxyalkynyl, C$_8$-C$_{30}$ hydroxyarylalkenyl, C$_8$-C$_{30}$ hydroxyarylalkynyl, C$_3$-C$_{30}$ polyether, C$_3$-C$_{30}$ polyetherester, C$_3$-C$_{30}$ polyester, C$_3$-C$_{30}$ polyamino, C$_3$-C$_{30}$ polyaminoamido, C$_3$-C$_{30}$ polyaminoether, C$_3$-C$_{30}$ polyaminoester, C$_3$-C$_{30}$ polyamidoester, C$_3$-C$_{30}$ alkylsulfonic acid, C$_3$-C$_{30}$alkylsulfonate salt, C$_1$-C$_{30}$ carboxylate salt, C$_1$-C$_{30}$ thiocarboxylate salt, C$_1$-C$_{30}$ dithiocarboxylate salt, or C$_4$-C$_{14}$ tetraalkyammonium salt.

4. The conjugated polymer of claim 1, wherein the fully conjugated polymeric sequence is a portion of a random copolymer.

5. The conjugated polymer of claim 1, wherein the fully conjugated polymeric sequence is a portion of a block, graft, branched, hyperbranched, or dendritic copolymer.

6. The conjugated polymer of claim 1, wherein the fully conjugated polymeric sequence is a portion of a network.

7. The conjugated polymer of claim 1, wherein the conjugated polymer or a polymeric precursor of the conjugated polymer is soluble in at least one solvent.

8. The conjugated polymer of claim 7, wherein the solvent comprises toluene, chloroform, dichloromethane, hexanes, tetrahydrofuran, chlorobenzene, water, ethanol, xylene, tetralin, or mesitylene.

9. The conjugated polymer of claim 1, wherein a thin film comprising the conjugated polymer in the neutral state displays a has a lambda max between 400 nm and 500 nm and greater than about 90% transmittance from 600 nm-750 nm.

10. The conjugated polymer of claim 1, wherein a thin film comprising the conjugated polymer in the oxidized state is color neutral having an a* of no greater than +/−10 and b* of no greater than +/−10.

11. The conjugated polymer of claim 1, wherein the conjugated polymer is electrochromic or electroluminescent.

12. A method of preparing a conjugated polymer according to claim 1 comprising a cross-coupling of monomers or trimers, wherein the cross-coupling comprises direct arylation, Stille coupling, Kumada coupling, Hiyama coupling, Negishi coupling, inverse Suzuki coupling, Grignard methathesis (GRIM) or oxidative polymerization.

13. An electrochromic device (ECD), comprising the conjugated polymer of claim 1 and at least one non-yellow or non-orange conjugated polymer that displays a primary subtractive color in a neutral state and is color neutral in an oxidized state.

14. The ECD of claim 13, wherein a plurality of the non-yellow conjugated polymers display red and blue or magenta and cyan in the neutral state.

15. The conjugated polymer of claim 1, wherein x is 1 and y is 1.

* * * * *

UNITED STATES PATENT AND TRADEMARK OFFICE
CERTIFICATE OF CORRECTION

PATENT NO. : 11,384,198 B2
APPLICATION NO. : 16/319910
DATED : July 12, 2022
INVENTOR(S) : John Robert Reynolds et al.

It is certified that error appears in the above-identified patent and that said Letters Patent is hereby corrected as shown below:

In the Specification

Column 2, Line 59:
"$C_3$-$C_{30}$"
Should read:
--$C_8$-$C_{30}$--

Column 14, Line 64:
"(A % T)"
Should read:
--($\Delta$%T)--

Column 21, Line 52:
"units a"
Should read:
--units α--

Column 23, Line 25:
"$(D_2Ar_z)$"
Should read:
--$(D_2Ar_z)_n$--

In the Claims

Column 34, Line 60:
"carbon a to"
Should read:
--carbon α to--

Signed and Sealed this
Twenty-sixth Day of March, 2024

Katherine Kelly Vidal
*Director of the United States Patent and Trademark Office*

CERTIFICATE OF CORRECTION (continued)
U.S. Pat. No. 11,384,198 B2

Column 35, Line 17:
"R, $R^3$, $R^4$, and $R^5$"
Should read:
--R, $R^1$, $R^3$, $R^4$, and $R^5$--